United States Patent [19]

Bartholomew et al.

[11] Patent Number: 5,852,785

[45] Date of Patent: Dec. 22, 1998

[54] SECURE ACCESS TELEPHONE EXTENSION SYSTEM AND METHOD IN A CORDLESS TELEPHONE SYSTEM

[76] Inventors: David B. Bartholomew, 5047 Cree Dr., West Valley City, Utah 84120; A. Ray Ivie, 1174 S.-400W, Orem, Utah 84058; Alma K. Schurig, 1175 E. 1220 N., Orem, Utah 84097

[21] Appl. No.: 639,508

[22] Filed: Apr. 29, 1996

Related U.S. Application Data

[63] Continuation of Ser. No. 34,086, Mar. 22, 1993, Pat. No. 5,530,737.

[51] Int. Cl.$^6$ ............................................. H04Q 7/20
[52] U.S. Cl. ............................................. 455/561; 370/18
[58] Field of Search ............................... 455/561; 370/18

[56] References Cited

U.S. PATENT DOCUMENTS

| | | |
|---|---|---|
| 2,510,273 | 5/1950 | Barstow et al. . |
| 2,516,211 | 7/1950 | Hochgraf . |

(List continued on next page.)

FOREIGN PATENT DOCUMENTS

| | | | |
|---|---|---|---|
| 549948 | 12/1942 | United Kingdom . | |
| 553225 | 5/1943 | United Kingdom . | |
| 683265 | 11/1952 | United Kingdom . | |
| 1549165 | 7/1979 | United Kingdom | G04F 10/00 |
| 2 086 106 | 5/1982 | United Kingdom | H04B 1/10 |
| 2 094 958 | 9/1982 | United Kingdom | H04B 3/54 |
| 2 110 034 | 6/1983 | United Kingdom | H04B 9/00 |
| 2 154 392 | 9/1985 | United Kingdom | H04M 1/68 |
| 2 159 023 | 11/1985 | United Kingdom | H04H 1/04 |
| WO95/29566 | 11/1995 | WIPO . | |

OTHER PUBLICATIONS

Fantel., "Sound Ideas," *New York Times Magazine* (Apr. 10, 1986).

Mayer., "Wireless Speakers to Shout About," *Recoton in the News/New York Post* (Dec. 18, 1987).

Warren., "Recoton Wireless 100 Speakers May Have a Bit of Magic" *Recoton in the News/Chicago Tribune* (Nov. 15, 1987).

Takiff., "Cord–Free Sound Makes Debut" *Video Insider* (Jun. 29, 1987).

"Investigation of the Noise in Power Line Carrier Channels and its Effect on Speech Intelligibility" Ishkin et al., International Conference on Large High Voltage Electric Systems (Aug. 21, 1978).

(List continued on next page.)

*Primary Examiner*—William Cumming
*Attorney, Agent, or Firm*—Lloyd W. Sadler; Eleanor V. Goodall; Daniel P. McCarthy

[57] ABSTRACT

A method and system is provided for conducting secure power line carrier communications in full duplex over the power lines of a building. Power line carrier current telephone extension systems utilize 1) a single BASE unit per central office line (for interfacing line carrier signals with the central office line) and 2) one or more EXTENSION units, one for each extension phone set (for interfacing said line carrier signals with said extension phone sets). The method employs system control logic for providing A) multiple extension arbitration logic, B) privacy from eavesdropping and C) security from third party central office line capture by means of a digital messaging system in each base and extension unit utilizing a unique and matching security key (preamble) with each message instructing the system to change operating states, such as, A) during a conversation an extension unit may be put on hold so that a second matching extension can pick up the line, B) a base unit rings matching extension units to signal an incoming call or C) an outgoing call is initiated by a user taking a matching extension phone off hook to access the central office line. Matching of the random security codes may be initiated by the user. By this means unauthorized access to the central office line (especially for long distance calls) and eavesdropping by other users in the same building with similar line carrier telephone extension products is prohibited.

7 Claims, 6 Drawing Sheets

U.S. PATENT DOCUMENTS

| | | | |
|---|---|---|---|
| 2,516,763 | 7/1950 | Edson et al. | |
| 2,535,446 | 12/1950 | Mitchell | |
| 2,567,908 | 9/1951 | Levy | |
| 2,577,731 | 12/1951 | Berger | |
| 2,654,805 | 10/1953 | Derr | |
| 2,820,097 | 1/1958 | Finlay | |
| 2,828,363 | 3/1958 | Ray | |
| 2,932,794 | 4/1960 | Crow | |
| 3,711,777 | 1/1973 | Tink | 325/320 |
| 3,766,479 | 10/1973 | Thalimer et al. | 325/320 |
| 3,769,463 | 10/1973 | Graham et al. | 179/7.1 |
| 3,777,065 | 12/1973 | Galian | 179/6 |
| 3,784,721 | 1/1974 | Kilby | 179/6 R |
| 3,793,487 | 2/1974 | Kilby | 179/6 R |
| 3,809,815 | 5/1974 | Reed et al. | 179/15 FD |
| 3,809,816 | 5/1974 | Reed et al. | 179/15 FD |
| 3,810,096 | 5/1974 | Kabat et al. | 340/147 R |
| 3,846,638 | 11/1974 | Wetherell | 307/3 |
| 3,852,740 | 12/1974 | Haymes | 340/416 |
| 3,864,521 | 2/1975 | DeLong et al. | 179/2.5 |
| 3,876,984 | 4/1975 | Chertok | 340/152 R |
| 3,886,534 | 5/1975 | Rosen et al. | 340/216 |
| 3,911,415 | 10/1975 | Whyte | 340/310 A |
| 3,920,924 | 11/1975 | Layburn | 179/18 AB |
| 3,922,664 | 11/1975 | Wadsworth | 340/276 |
| 3,924,223 | 12/1975 | Whyte et al. | 340/310 R |
| 3,925,728 | 12/1975 | Whyte | 324/142 |
| 3,925,763 | 12/1975 | Wadhwani et al. | 340/164 R |
| 3,927,316 | 12/1975 | Cittia | 250/199 |
| 3,949,172 | 4/1976 | Brown et al. | 179/2.5 R |
| 3,951,248 | 4/1976 | Feiner et al. | 179/81 |
| 3,980,954 | 9/1976 | Whyte | 325/48 |
| 4,001,508 | 1/1977 | Johnson | 179/6 D |
| 4,012,596 | 3/1977 | West, Jr. et al. | 179/41 A |
| 4,031,333 | 6/1977 | Fouratt | 179/81 R |
| 4,031,840 | 6/1977 | Anderson | 179/15 FD |
| 4,041,291 | 8/1977 | Pavda | 235/156 |
| 4,057,793 | 11/1977 | Johnson et al. | 340/310 R |
| 4,058,678 | 11/1977 | Dunn et al. | 179/2.5 R |
| 4,071,699 | 1/1978 | Jovic et al. | 179/5.5 |
| 4,075,829 | 2/1978 | Goff | 58/152 T |
| 4,079,201 | 3/1978 | Scott et al. | 179/7.1 R |
| 4,088,839 | 5/1978 | Stein, Jr. | 179/7.1 R |
| 4,091,238 | 5/1978 | Samuels et al. | 179/7.1 R |
| 4,122,308 | 10/1978 | Weinberger et al. | 179/7.1 R |
| 4,131,881 | 12/1978 | Robinson | 340/167 |
| 4,169,217 | 9/1979 | Szanto et al. | 179/81 C |
| 4,174,517 | 11/1979 | Mandel | 340/310 A |
| 4,194,087 | 3/1980 | Sakaida | 179/1 GD |
| 4,207,527 | 6/1980 | Abt | 455/110 |
| 4,210,779 | 7/1980 | Simokat | 179/2.51 |
| 4,218,655 | 8/1980 | Johnston et al. | 455/39 |
| 4,222,036 | 9/1980 | Lohoff | 340/167 R |
| 4,239,940 | 12/1980 | Dorfman | 179/2.51 |
| 4,254,403 | 3/1981 | Perez-Cavero et al. | 340/310 R |
| 4,255,618 | 3/1981 | Danner et al. | 179/1 B |
| 4,260,855 | 4/1981 | Rubinstein | 179/7.1 R |
| 4,264,956 | 4/1981 | Delaney | 364/467 |
| 4,288,753 | 9/1981 | Babano | 330/51 |
| 4,307,380 | 12/1981 | Gander | 340/310 R |
| 4,319,091 | 3/1982 | Meri | 179/16 EA |
| 4,321,581 | 3/1982 | Tapeiner et al. | 340/310 R |
| 4,323,882 | 4/1982 | Gajjar | 340/310 R |
| 4,344,066 | 8/1982 | Beggs | 340/310 R |
| 4,357,598 | 11/1982 | Melvin, Jr. | 340/310 A |
| 4,380,009 | 4/1983 | Long et al. | 340/825.55 |
| 4,398,060 | 8/1983 | Ienaka et al. | 179/1 GD |
| 4,408,186 | 10/1983 | Howell | 340/310 |
| 4,442,319 | 4/1984 | Treidl | 179/2 A |
| 4,442,546 | 4/1984 | Ishigaki | 455/72 |
| 4,455,651 | 6/1984 | Baran | 370/140 |
| 4,457,019 | 6/1984 | Szabo, Jr. et al. | 455/41 |
| 4,471,399 | 9/1984 | Udren | 361/64 |
| 4,473,718 | 9/1984 | Ettel | 179/2 TC |
| 4,473,817 | 9/1984 | Perkins | 340/310 R |
| 4,475,193 | 10/1984 | Brown | 370/124 |
| 4,491,957 | 1/1985 | Kamalski | 381/13 |
| 4,495,386 | 1/1985 | Brown et al. | 179/2.51 |
| 4,497,033 | 1/1985 | Brown et al. | 179/2.51 |
| 4,514,594 | 4/1985 | Brown et al. | 179/2.51 |
| 4,517,410 | 5/1985 | Williams et al. | 179/6.04 |
| 4,518,827 | 5/1985 | Sagara | 179/81 R |
| 4,523,307 | 6/1985 | Browne et al. | 370/30 |
| 4,544,808 | 10/1985 | Milne et al. | 179/99 LS |
| 4,546,214 | 10/1985 | Laing | 179/81 C |
| 4,551,581 | 11/1985 | Doughty | 179/2 A |
| 4,559,520 | 12/1985 | Johnston | 340/310 R |
| 4,582,956 | 4/1986 | Doughty | 179/2 A |
| 4,585,904 | 4/1986 | Mincone et al. | 179/7.1 |
| 4,602,340 | 7/1986 | Appelberg | 364/492 |
| 4,623,761 | 11/1986 | Winter et al. | 379/84 |
| 4,641,126 | 2/1987 | Crowe | 340/310 A |
| 4,641,322 | 2/1987 | Hasegawa | 375/1 |
| 4,647,723 | 3/1987 | Voorhies | 379/381 |
| 4,653,094 | 3/1987 | Rasmussen et al. | 379/396 |
| 4,656,657 | 4/1987 | Hunsicker | 379/140 |
| 4,658,096 | 4/1987 | West, Jr. et al. | 379/59 |
| 4,680,785 | 7/1987 | Akiyama et al. | 379/57 |
| 4,686,698 | 8/1987 | Tompkins et al. | 379/53 |
| 4,688,210 | 8/1987 | Eizenhofer et al. | 370/18 |
| 4,697,282 | 9/1987 | Winter et al. | 379/67 |
| 4,701,945 | 10/1987 | Pedigo | 379/66 |
| 4,704,726 | 11/1987 | Gibson | 381/13 |
| 4,710,917 | 12/1987 | Tompkins et al. | 370/62 |
| 4,716,585 | 12/1987 | Tompkins et al. | 379/202 |
| 4,723,279 | 2/1988 | Field | 379/396 |
| 4,734,930 | 3/1988 | Quiros et al. | 379/88 |
| 4,751,728 | 6/1988 | Treat | 379/113 |
| 4,759,016 | 7/1988 | Otsuka | 370/75 |
| 4,775,997 | 10/1988 | West, Jr. et al. | 379/58 |
| 4,776,002 | 10/1988 | Kammerl | 379/88 |
| 4,783,780 | 11/1988 | Alexis | 370/95 |
| 4,813,014 | 3/1989 | DeBell | 365/45 |
| 4,827,501 | 5/1989 | Hansen | 379/199 |
| 4,829,570 | 5/1989 | Schotz | 381/3 |
| 4,847,829 | 7/1989 | Tompkins et al. | 370/62 |
| 4,847,903 | 7/1989 | Schotz | 381/3 |
| 4,864,589 | 9/1989 | Endo | 375/1 |
| 4,873,493 | 10/1989 | Fujiwara | 330/285 |
| 4,881,205 | 11/1989 | Aihara | 365/222 |
| 4,893,329 | 1/1990 | O'Brien | 379/88 |
| 4,901,307 | 2/1990 | Gilhousen | 370/18 |
| 4,908,845 | 3/1990 | Little | 379/51 |
| 4,912,553 | 3/1990 | Pal et al. | 358/86 |
| 4,920,556 | 4/1990 | Wong | 379/51 |
| 4,922,517 | 5/1990 | West, Jr. et al. | 379/58 |
| 4,924,496 | 5/1990 | Figa et al. | 379/142 |
| 4,926,465 | 5/1990 | Kim | 379/131 |
| 4,942,598 | 7/1990 | Davis | 379/57 |
| 4,955,050 | 9/1990 | Yamauchi | 379/59 |
| 4,959,851 | 9/1990 | Tobolski, Jr. et al. | 379/59 |
| 4,963,853 | 10/1990 | Mak | 340/310 A |
| 4,968,970 | 11/1990 | LaPorte | 340/310 A |
| 4,983,927 | 1/1991 | Torazzina | 330/51 |
| 5,014,267 | 5/1991 | Tompkins et al. | 370/62 |
| 5,029,198 | 7/1991 | Walpole et al. | 379/88 |
| 5,031,205 | 7/1991 | Phillips | 379/88 |
| 5,062,134 | 10/1991 | Laird | 379/131 |
| 5,066,939 | 11/1991 | Mansfield, Jr. | 340/310 R |
| 5,068,890 | 11/1991 | Nilssen | 379/90 |
| 5,077,682 | 12/1991 | Kim | 364/569 |
| 5,091,942 | 2/1992 | Dent | 380/46 |

| | | | |
|---|---|---|---|
| 5,101,501 | 3/1992 | Gilhousen et al. | 455/33 |
| 5,133,001 | 7/1992 | Bohm | 379/58 |
| 5,136,612 | 8/1992 | Bi | 375/1 |
| 5,151,838 | 9/1992 | Dockery | 340/310 R |
| 5,265,150 | 11/1993 | Helmkamp et al. | 379/58 |
| 5,289,542 | 2/1994 | Kessler | 380/9 |
| 5,311,570 | 5/1994 | Grimes et al. | 379/57 |
| 5,317,545 | 5/1994 | Gray et al. | 368/4 |
| 5,319,634 | 6/1994 | Bartholomew et al. | 370/18 |
| 5,327,230 | 7/1994 | Dockery | 348/8 |
| 5,351,272 | 9/1994 | Abraham | 275/38 |
| 5,428,663 | 6/1995 | Grimes et al. | 379/57 |
| 5,530,737 | 6/1996 | Bartholomew et al. | |

OTHER PUBLICATIONS

Baden., "The Power Line Carrier System of the Cabora Bassa High–Voltage Direct currnet Transmission Line," *Brown Boveri Review* 8–77.

Baden, B., "Power System Communications" *Brown Boveri Review* 64–77.

Alvich, M., "Office Essentials—Accessories and Supplies," *Home–Office Computing* (Mar. 1989) 3, 70.

"Phone–Control™," Phillips Home Electronics, Inc., 1992.

"Recent Incorporations," *Mass High Tech* (Oct. 1983).

SECURE ACCESS TELEPHONE EXTENSION SYSTEM AND METHOD IN A CORDLESS TELEPHONE SYSTEM

This is a continuation of application Ser. No. 08/034,086, filed Mar. 22, 1993, now U.S. Pat. No. 5,530,737.

I. BACKGROUND OF THE INVENTION

A. Field of the Invention

This invention relates to the field of power line carrier current telephone extension systems. More particularly, this invention relates to secure system control protocols for line carrier telephone extension systems, which provide multiple extension arbitration logic, privacy, security and other telephone signaling options, which technique is called Secure Access (SA).

B. The Background Art

Numerous attempts have been made to utilize the power lines of buildings for telephone communications with varying degrees of success. Line carrier telephone extension systems utilize 1) a single BASE unit per central office line (for interfacing line carrier signals with the central office line) and 2) one or more EXTENSION units, one for each extension phone set (for interfacing said line carrier signals with said extension phone sets). Full duplex communication is usually attempted by using two carrier frequencies, one for each direction. Usually a transmitter and receiver are included in each base and extension station which are operating simultaneously when communication is in progress. For economic reasons FM modulation of the carrier by audio (speech) signals is often employed, of which U.S. Pat. Nos. 3,949,172 and 4,701,945 are examples. The physical range of line carrier communications systems is usually limited to the confines of the secondary of the power line transformer and is subject to severe noise and attenuation variances depending upon carrier frequencies and load conditions.

While noise and attenuation problems may be overcome somewhat by increasing transmitter power levels or increasing receiver sensitivity, this increases the potential for interference from neighbors with similar systems, which aggravates the problems of privacy and security prior art line carrier systems exhibit. Thus, privacy or security breaches arise when other users on the same power distribution system or in the same apartment complex with the same line carrier devices can make long distance calls on another user's line and eavesdrop on their conversations. But people driving by in cars cannot scan and eavesdrop on the line carrier signals the way they can cordless phone RF transmissions. The impact of these problems has already been demonstrated in the cordless telephone industry, which shares some of the same limitations as the line carrier industry. Security from line capture by third parties has been provided by security coding protocols in the cordless phone industry. But people with scanners or cordless phone receivers can eavesdrop on a neighbor's cordless call. Also, no provision is made for multiple cordless extension phones utilizing the same base. Similarly, in line carrier systems it was not permitted for more than one system to use the same power lines in the same building.

The subject matter of the instant invention relates somewhat to that of a previous application by the inventors hereof filed Oct. 7, 1991, U.S. Ser. No. 07/773,009, entitled "MULTIPLE ACCESS TELEPHONE EXTENSION SYSTEMS AND METHOD". The previous application relates primarily to a combination of radio frequency (RF) transmission techniques such as frequency division multiple access (FDMA) and code division multiple access (CDMA or spread spectrum). The instant application relates to the use of audio and subaudio frequency system control logic keys which unlock telephone signalling, RF and voice transmissions such as capturing the central office line, ringing the extension and speaking in full duplex between the base and extension units. The use of system control logic messages with security keys allows for non-simultaneous multiple use of the same power distribution system with privacy from eavesdropping and security. The system control logic also prevents another user from interrupting and terminating a call which is in progress. Other multiple extension arbitration logic functions are provided to permit one extension to put a call on hold and transfer the call to another extension unit. Use of FDMA in combination with security/control keys provides true multiple access and security at a low cost.

Commercial applications for the secure access line carrier telephone extension technology include computer modem interfaces for pay-per-view (PPV) systems and gas pump/security office systems, where it is difficult to retrofit phone lines and twisted pairs into existing construction.

Since an increasing number of people live in apartments and condominiums which share power lines and because an increase in transmission power and receiver sensitivity are required to overcome attenuation and noise problems, it is important for a telephone extension system to utilize privacy and security coding in a unique and skillful manner to permit acceptable operation.

II. SUMMARY OF THE INVENTION

Many prior art limitations can be overcome by proper application of secure access techniques as employed in the instant invention. Secure access (SA) techniques include the use of a digital data transmission channel operating at audio FSK rates which exchanges messages between base and extension unit controllers, which messages are composed of a sync byte, a unique security key and a system control key. SA techniques require hardware "locks" on audio, RF and system control paths which can only be connected ("opened") by receipt of the proper control key. The message can be Manchester encoded to eliminate any net DC component to the message when modulated and demodulated. Data transmission techniques such as Manchester encoding are described in the ITT "Reference Data for Radio Engineers", Fifth Ed., Howard W. Sams & Co., 1972, which is made a part hereof by reference.

A sync byte (8 bits) at the first part of the message allows for the receiving controller to determine that a message is being sent and that the digital 1's and 0's which follow in the keys will be valid in certain time slots. Thus, the sync byte very quickly initializes a digital phase-locked loop in the receiving controller and facilitates asynchronous communications. It is important for the communication to initialize rather quickly with respect to ring commands, pulse dialing and offhook/flash signals for the line carrier extension system to be transparent with respect to most phone user services. On the other hand increasing the data rate too high will make the data susceptible to noise and interference corruption due to loss of processing gain. Realistic data rates are about 1 to 4 KBs.

The security key follows the sync byte and may be of any practical length, such as 16 bits (2 bytes), providing for 65,536 codes. Receipt of a valid security code enables the control key, which follows. The security codes may be either randomly selected by the controller or manually selected by user accessible switches. A security code matching procedure provides for base and extension units to share the same code and thus be able to accept control keys from each other.

The control key follows the security key and may be 1 or 2 bytes long depending on the sophistication required by the system control logic. For example, a pulse command might require 2 bytes if the first byte is the "pulse" command and the second byte specifies the duration of the pulse, thereby distinguishing between pulse dial pulses and "flash" pulses used for call waiting, etc. Thus, telephone control signals are resynthesized by the base or extension controller as requested by control keys for transparent operation.

To complete the system requirements for secure access, hardware locks (digitally controlled analog switches) must be provided in all essential telephone signal and control paths which are operated by the system controller when proper security and control keys are received.

Since prior art line carrier telephone extension systems do not combine the essential elements of secure access technology, they cannot operate in an acceptable commercial manner.

Accordingly, it is an object of the present invention to provide an effective method of secure access (SA) communication which provides for access of a plurality of signals on a single communications medium.

It is a further object to provide a method and system of line carrier telephone communications which utilizes SA (secure access) to provide a high degree of security for preventing unauthorized access to the subscriber's line, and which provides privacy with respect to the conversation from third parties, and which provides nearly transparent interconnectivity between extension phones and the central office line.

It is an object to provide a method and system of multiple extension arbitration logic to provide multiple extensions for the same subscriber line which do not interfere with each other.

An additional object is to provide a method and system of line carrier telephone communications which utilizes FDMA (frequency division multiple access) in combination with SA (secure access) to prevent interference between relatively close neighboring transmission systems or partner transmissions in the same system and to provide for multiple access (simultaneous transmission) of duplex signals for at least two telephone lines.

It is an object to provide a method and system of secure access cordless telephone communications which applies the same secure access techniques to obtain the same advantages as for the line carrier telephone extension systems and method.

These and other objects and advantages of the invention and method will become more fully apparent as the description which follows is read in conjunction with the drawings.

III. BRIEF DESCRIPTION OF THE DRAWINGS

Figure 3:
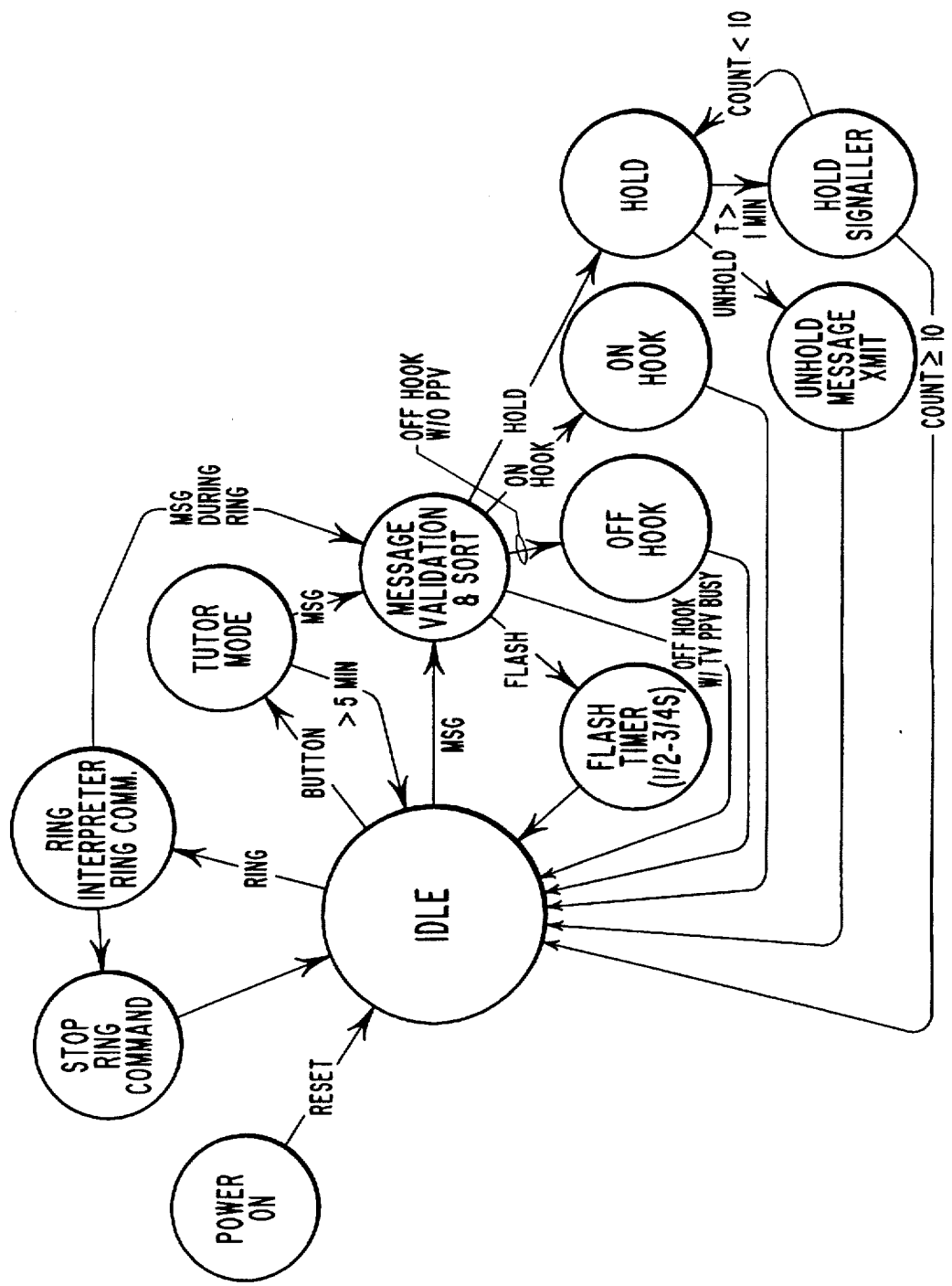

FIG. 3 a is a state diagram for a base unit system controller.

Figure 4:
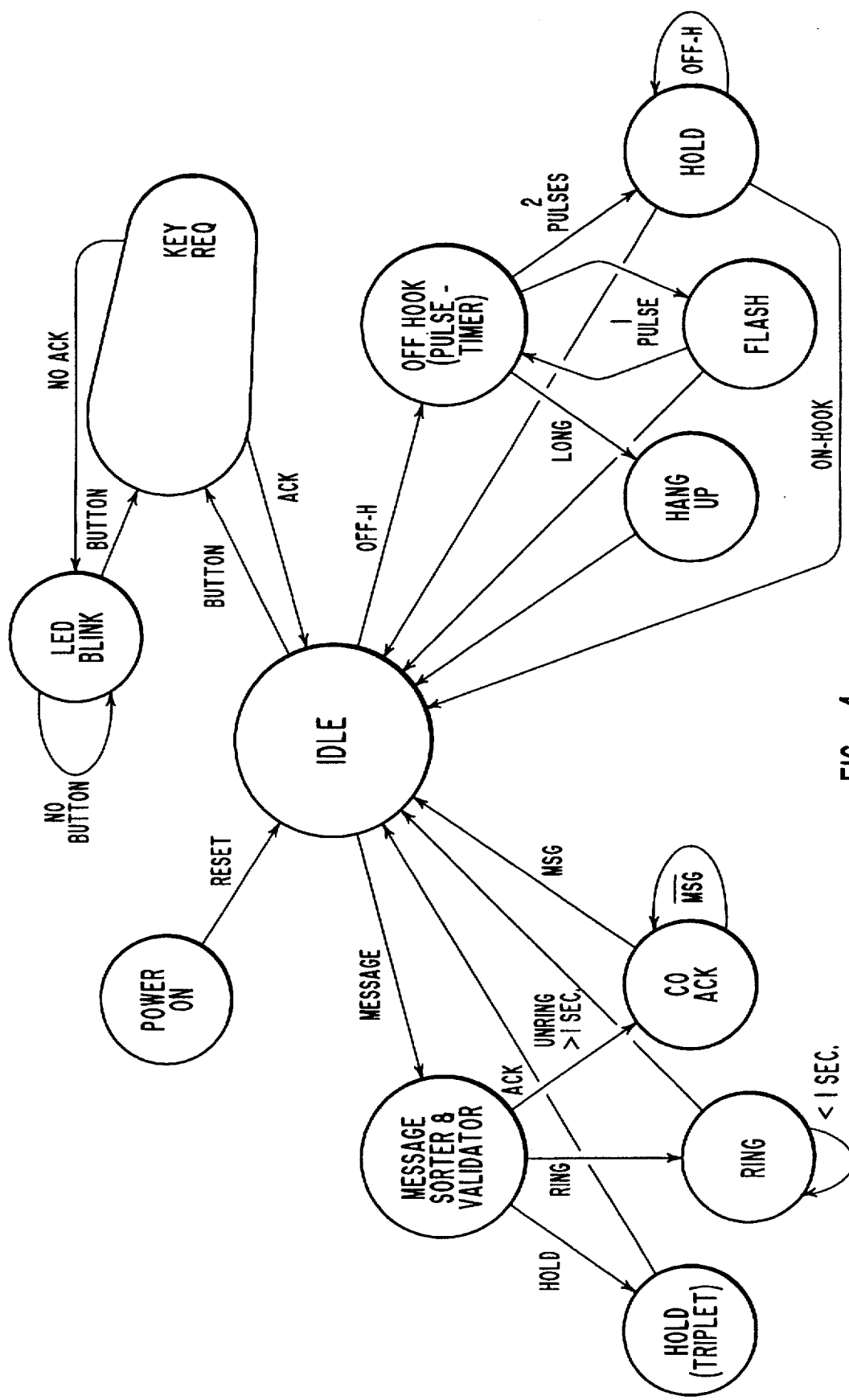

FIG. 4 is a state diagram for an extension unit system controller.

Figure 5:
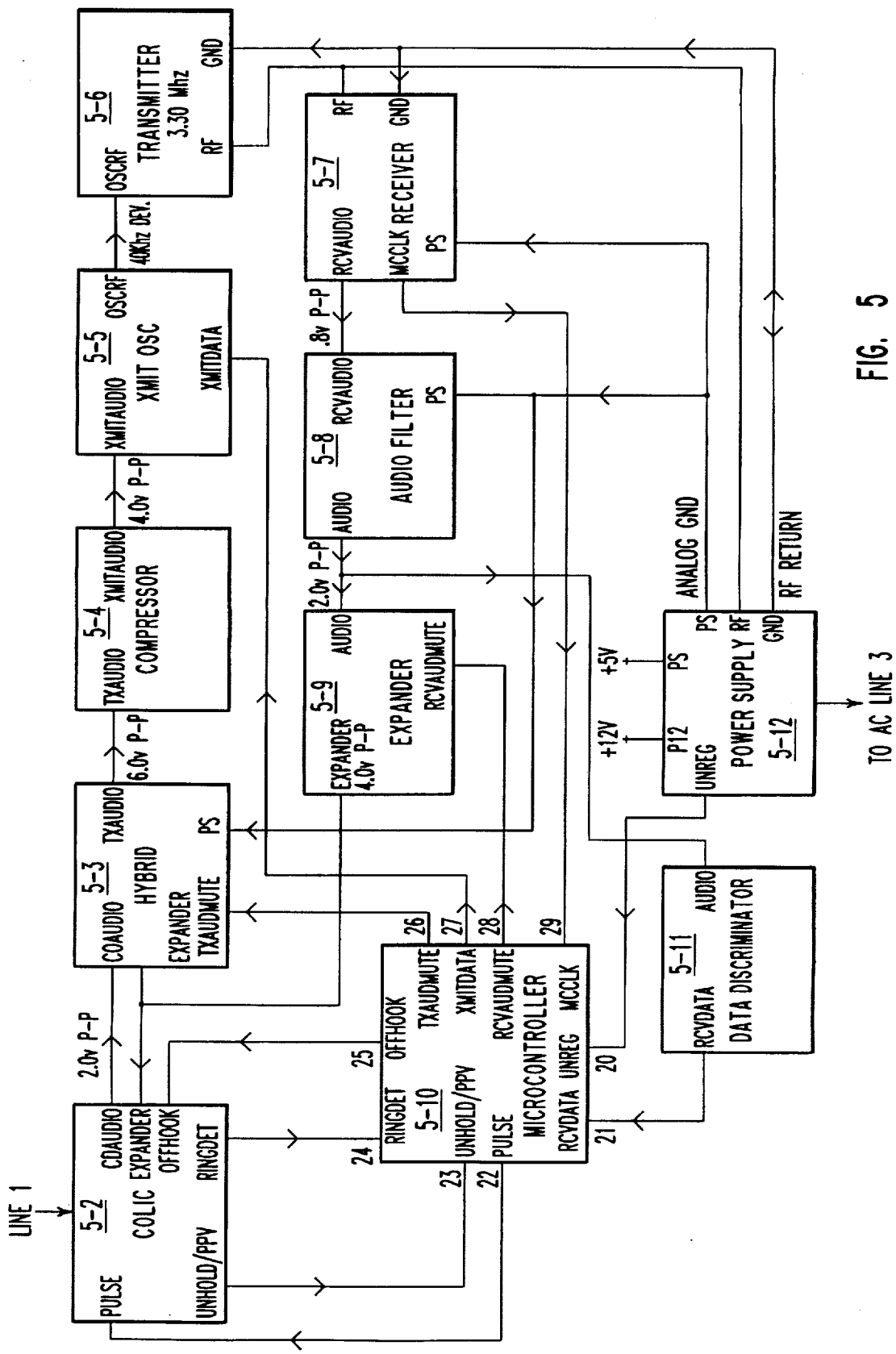

FIG. 5 is an electrical block diagram of a base unit of a secure access line carrier telephone extension system, which interfaces a subscriber line with the AC power distribution system of a building.

Figure 6:
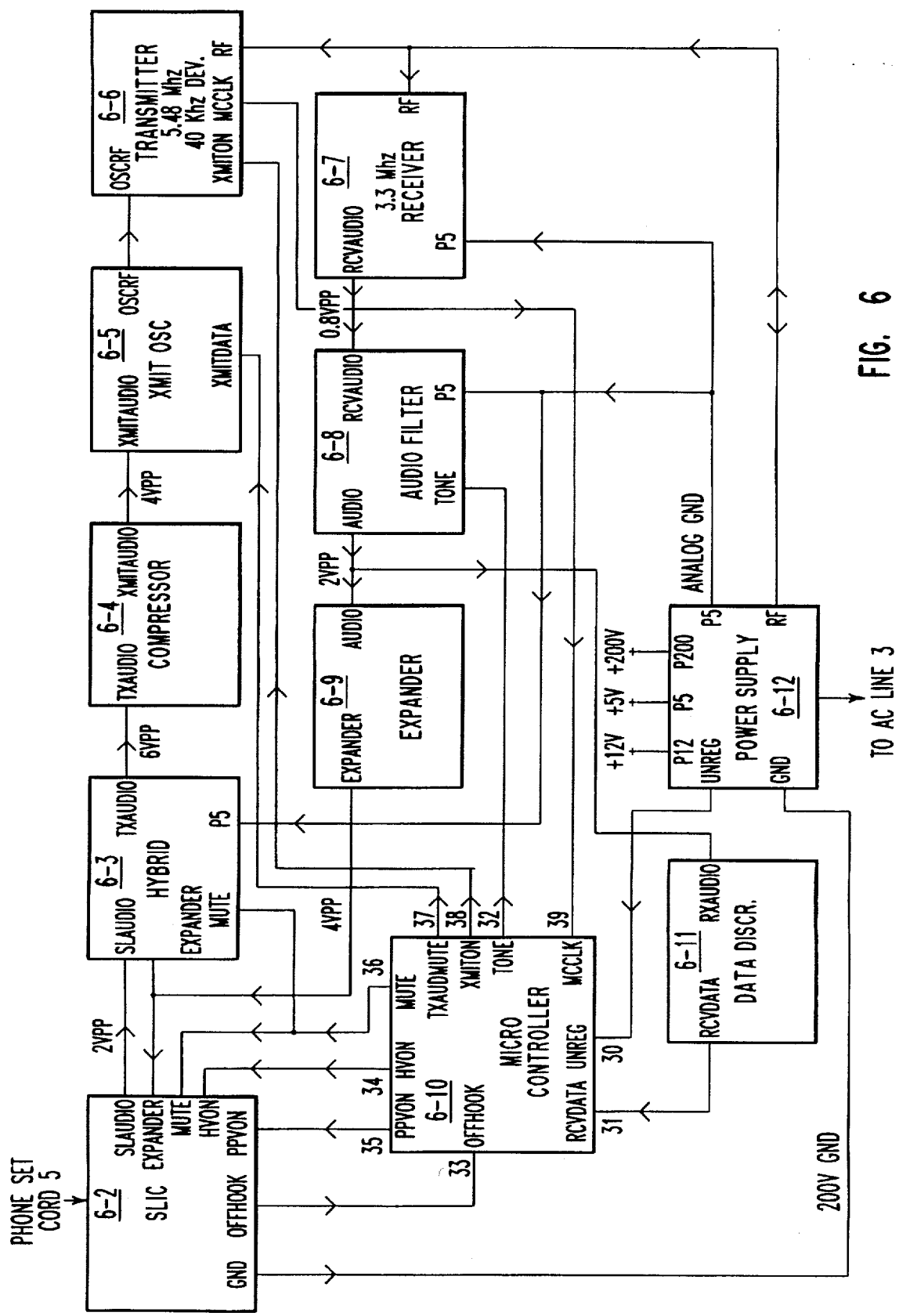

FIG. 6 is an electrical block diagram of an extension unit of a secure access line carrier telephone extension system, which interfaces an extension phone to the power line distribution system of a building.

IV. DESCRIPTION OF THE PREFERRED EMBODIMENTS

Figure 1:
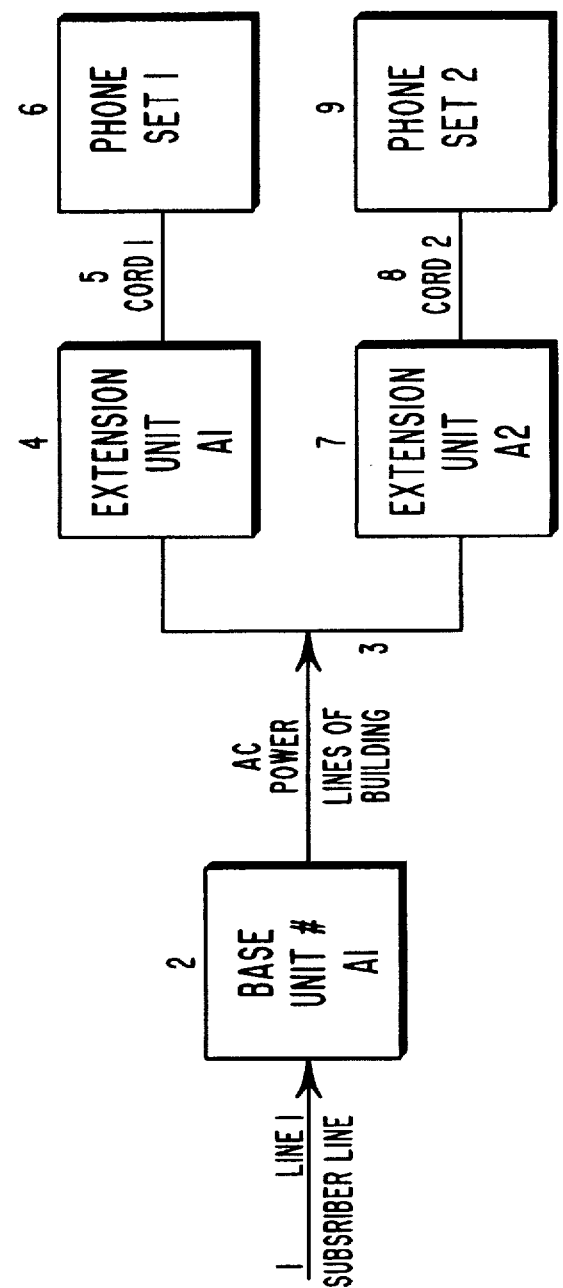
FIG. 1 is a block diagram of a line carrier telephone extension system servicing a single subscriber line and a plurality of extension phone sets.

Reference is first made to the illustration of a line carrier telephone extension system in FIG. 1 which services a single subscriber line 1 and a plurality of extension phone sets 6 and 9. Subscriber line 1 plugs into base unit 2 which provides the interface circuitry and protocols for the subscriber line signals (including ring, off hook and duplex audio) and for secure access power line carrier signals, which are carried through a building via AC power lines 3 to extension interface units 4 and 7. The extension units 4 and 7 are single line extensions and provide means to interface the secure access line carrier signals to single line phone sets 6 and 9 via cords 5 and 8, respectively.

A line carrier system as illustrated in FIG. 1 must operate in a manner which is transparent to the extension phone set user. Thus, by means of base unit 2, AC power lines 3 and extension unit 4, an incoming ring signal is detected in the base unit, encoded into secure access line carrier signals, transferred through the power line, decoded in the extension unit and converted to a ring signal of identical length for extension phone set 6. When a user picks up the receiver of an extension phone set, it goes off hook, which condition is detected in the extension unit 4, encoded by said extension unit into secure access line carrier signals and transmitted via power lines 3 to the base unit 2 where the secure access line carrier signals are decoded and the subscriber line is captured by off hook circuitry. Duplex audio circuitry is unlocked and connected to the line and bidirectional transmission of voice and/or dial tones and DTMF takes place, with the voice signals modulating line carrier signals, which are transmitted via power lines 3 and decoded/demodulated back into voice in the base and extension units. Specific subsystems and corresponding functions will be addressed in reference to FIGS. 5 and 6.

FIG. 1 also may be used to illustrate multiple extension arbitration logic. For example, when a central office sends a ring signal through the subscriber line 1 into the base unit 2, the base unit 2 qualifies the ring signal for both frequency (15 to 110 Hz) and amplitude (40 Vrms min.) and sends start and stop ring messages to both extension units 4 and 7, which ring messages are detected and converted to standard ring signals which ring both phone sets 6 and 7 with substantially the same ring cadence as that of the original central office ring signal. Suppose a user then takes phone set #2 (9) off hook, which is detected in the corresponding extension unit #A2 (7), which unit sends an off hook request message to the base unit 2 which 1) qualifies the security code and off hook message, 2) captures the subscriber line and 3) sends an off hook acknowledgment message to both extension units, which off hook acknowledgment message allows only extension unit #A2 (7) to connect audio and signalling circuitry between itself 7 and phone set #2 (9), enabling the user to engage in normal telephone communications. If a second user at phone set 1 6 takes his receiver off hook while phone set #2 (9) is in use, the system control logic in extension unit #A1 (4) will produce a busy tone for phone set #1 (6) and will not permit the second user access to the on going conversation because the system control logic recognizes that it did not make the first off hook request and was on hook when the first off hook acknowledgment was received. If, however, the first user goes on hook at phone set #2 (9) while the second user at phone set #1 (6) is off hook, extension unit #A2 (7) will send a hang message to the base unit 2 which returns an "unack" message to all extension units (but does not immediately hang up), upon receipt of which unack message by extension unit #A1 (4) it sends an offhook request to the base unit 2 and connects audio upon receipt of an acknowledgment message from the base. Logic in the base unit refrains from hanging up the central office following a hang message for only sufficient time to permit a second extension to request the line following the unack message from the base.

Multiple extension arbitration logic permits a user to put a call on hold by pressing the switch hook twice quickly on his extension phone set 1 or 2. A tone generated in the corresponding extension unit 4 or 7 confirms the hold request state. The extension unit sends a hold message to the base unit 2 whereupon the base unit 1) mutes the subscriber line audio while still capturing the line and 2) sends to all extension units a 3 short ring cadence message every 45 seconds or so for ten periods, following which the base rings twice and waits a last 20 seconds before hanging up the line if the user does not take the call. During this time any extension phone set including hardwired phones can be taken offhook by a user and signal the holding base unit to go off hold; phone set 1 or 2 sends off hook requests to the base unit which unlocks the audio path; if a hard wired phone goes offhook, the base unit detects a drop in subscriber line voltage and releases line capture to the hard wired phone set. The system control logic is more particularly described in FIGS. 3 and 4.

Figure 2:
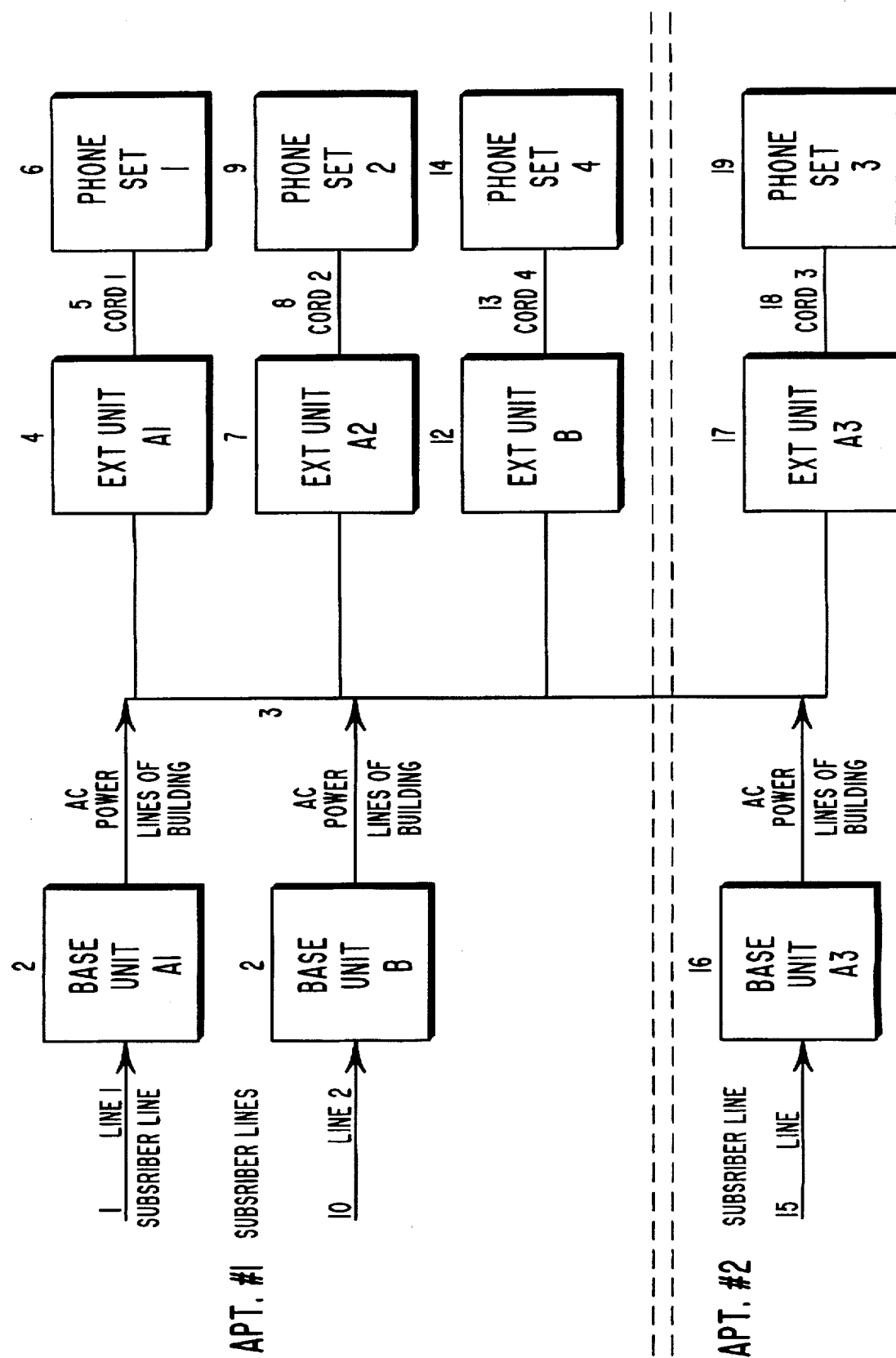
FIG. 2 is a block diagram of a line carrier telephone extension system servicing a plurality of subscriber lines and extension phones in an apartment complex with a common AC power distribution system.

FIG. 2 illustrates a combined application of secure access and multiple access technologies in which several apartments share a common AC power distribution system and service a plurality of subscriber telephone lines and line carrier extensions. Because all "A" units use the same line carrier frequencies, secure access techniques are required to provide privacy and security between Apt #1 line 1 and the Apt #2 line 15. The user in Apt #1 can match codes in his units by first pressing a button on base unit # A1 (2) and then within a minute pressing the corresponding buttons on extension unit #A1 (4) and #A2 (7). Pressing the buttons puts the units into the learn mode, where the extensions send out a request for the randomly selected security key in the base unit, which the base returns to the extension units. Since the user in Apt #2 has no idea when the user in Apt #1 is going to match his security codes, his units A3 will have a different code. This provides for the multiple use of the AC power lines by the A frequency units on a non-simultaneous basis. Base unit #B (11) and corresponding extension unit #B (12) use a different set of multiple access transmission frequencies, which provides for true simultaneous use of the AC line medium for line #2 (10). Line 2 could be used for a modem, fax, pay-per-view television service or other telephone apparatus.

FIG. 3 and FIG. 4 provide a logic state diagram for the system control protocols disclosed above in connection with FIGS. 1 and 2, except for the power on procedure. If during a "power on" reset procedure a unit checks non-volatile memory for a valid security code and does not find one, then it provides a default security code; otherwise it uses the code retained in memory. Since no on/off switch is provided for the units, when the AC line power is on so are the units. In the event of a power failure or unplugging of a unit, the currently used security code is saved in non-volatile memory, so that when power is restored the security code is maintained. Any number of commercial low cost microcontrollers can be employed for this application, such as the Motorola 6805 series or the Zilog Z8 series. A listing of working commercial code for this application as used in one embodiment of the invention is provided in Appendix A and is incorporated herein by reference. Other code may be used as well and still fall within the scope of the invention.

FIG. 5 is page 1 of a hierarchical schematic diagram of a secure access base unit 2 from the systems of FIG. 1 and 2. Each of the blocks 5-2 through 5-12 are illustrated as complete electrical schematics in Appendix B, according to hierarchical schematic procedures. Appendix B is hereby incorporated by reference. Other electrical schematics embodying the inventors' invention may be employed as well and are intended be comprehended within the scope of the invention. Phone line 1 is connected to colic 5-2, and AC power line 3 interfaces with power supply 5-12. Particular attention is directed to the microcontroller 5-10 with its attendant I/O lines 20 through 29. The "unreg" 20 input provides the power on/off reset of FIG. 3 and 4. On power up care is taken to start the controller after the power supplies and clock 29 are stable, and upon power down, to stop the controller before the clock and power supplies become unstable. Data from the extension(s) 4 is received and discriminated through blocks 5-12, 5-7, 5-8, and 5-11 and enters the microcontroller 5-10 via line 21 where the data is validated and sorted into system control instructions. Other hardware inputs include phone line 1 ring signal detection 24 and off hook status detection 23 with respect to hard wired phones on line 1. The microcontroller 5-10 logic acts upon these inputs to provide the appropriate system control responses. Ring signals at 24 produce ring messages at data output 27 which are transmitted via 5-5, 5-6, 5-12 and 3 to the extension unit(s). When an extension unit makes a central office request through 21, the base controller 5-10 takes line 1 off hook via control port 25, sends an acknowledgment message back to the extension unit, unmutes the transmit and receive audio via control ports 26 and 28, and the extension unit can either talk with a caller or, upon hearing a central office dial tone, send DTMF signals or pulse dial messages to dial a phone number. Pulse dial messages are processed through control port 22 for optimum compatibility with the central office. The flow of other audio and RF signals as indicated in FIG. 5 will be apparent to a person of ordinary skill in the art.

FIG. 6 is page 1 of a hierarchical schematic diagram of a secure access extension unit 4 (or 7, 12 or 17). Each of the blocks 6-2 through 6-12 are illustrated as complete electrical schematics in Appendix B, according to hierarchical schematic procedures. Phone set cord 5 is connected to SLIC 6-2, and AC power line 3 interfaces with power supply 6-12. Attention is directed to the microcontroller 6-10 with its attendant I/O lines 30 through 39. The unreg 30 input provides the power on/off reset of FIG. 3 and 4. On power up care is taken to start the controller after the power supplies and clock 39 are stable, and upon power down, to stop the controller before the clock and power supplies become unstable. Data from the base unit 2 is received and discriminated through blocks 6-12, 6-7, 6-8, and 6-11 and enters the microcontroller 6-10 via line 31 where the data is validated and sorted into system control instructions. The other hardware input is off hook status detection 33 of the extension phone set 6. The microcontroller 6-10 logic acts upon these inputs to provide the appropriate system control responses. Ring messages from the base are validated and sent through port 34 to the slic 6-2 which rings the extension phone set 6. When a user takes the extension phone off hook, this indication at port 33 makes the controller turn off the high voltage ring at 34, check the status of the system for other extensions in use, and if all is clear, turn on the transmitter via 38, message the base 2 to access the central office line 1, receive and validate a "co acknowledgment" message returning through 31, unmute audio paths via 36, and the extension unit can either talk with a caller or, upon hearing a central office dial tone, send DTMF signals or pulse dial messages to dial a phone number. The extension unit can also indicate to certain phone accessories connected in place of phone set 6 that line 1 is in use by hardwired phone sets by means of port 35 and hardware in slic 6-2 which produces a lower line voltage at cord 5. The flow of other audio and RF signals as indicated in FIG. 6 will be apparent to a person of ordinary skill in the art.

Many variations on the system illustrated in FIGS. 1-6 are readily manifest from previous discussions herein. One obvious variation is the application of the herein described secure access techniques to a cordless extension telephone system, wherein an RF carrier replaces the power line carrier and an antenna replaces the power line interface.

Another variation replaces the analog compandor and FM modulation technique with a CVSD (continuously variable slope delta modulator) and FSK modulation. A CVSD may also be regarded as a single bit A/D converter with companding. A CVSD requires a 16 kBs to 32 kBs FSK rate at transmitter and receiver, which is practical with some commercial receiver chips. Security can be provided for digital data transmissions by providing encryption techniques.

Many receiver chips also provide FM demultiplex capability, which provides several additional approaches to audio and control signaling. For example, the secure access control signaling could be transmitted on an upper sideband simultaneously with lower sideband audio. This could enhance transparency of operation by not muting audio during certain signaling operations. Also, a separate data channel could be implemented using a subaudio modulation technique.

Some variations could be made in the structure of the secure access message and its sync techniques, system control instructions and security code structure/length. Because of the frequency lock between transmitter and receiver, synchronous data transmission techniques are feasible which simplify data discrimination.

While the present invention has been described and illustrated in conjunction with a number of specific embodiments, those skilled in the art will appreciate that variations and modifications may be made without departing from the principles of the invention as herein illustrated, described and claimed.

The present invention may be embodied in other specific forms without departing from its spirit or essential characteristics. The described embodiments are to be considered in all respects as only illustrative, and not restrictive. The scope of the invention is, therefore, indicated by the appended claims, rather than by the foregoing description. All changes which come within the meaning and range of equivalency of the claims are to be embraced within their scope.

APPENDIX A

SECURE ACCESS SOFTWARE LISTING

```
;Intelejak Z86C08 control software (c) 1993 Phonex Corporation
;Software Revision:
AAitj1v0        ;Released on 2/3/93
        .z8regdefs ;--------------- Hardware assignments for the I/O ports ---------------
;........................ PORT 0 ....................
mutee           .equ    00000001b       ;p00
msgfs           .equ    00000010b       ;p01
ledon           .equ    00000100b       ;p02
bp0dad  =       00000101b               ;base p0 data default
ep0dad  =       00000101b               ;ext p0 data default
;........................ PORT 2 ....................
boffhooke       .equ    00000001b       ;p20
eppvon          .equ    00000001b       ;p20
bpulsee         .equ    00000010b       ;p21
exmiten         .equ    00000010b       ;p21
pshbtni         .equ    00000100b       ;p22
bringi          .equ    00001000b       ;p23
chvon           .equ    00001000b       ;p23
ospe            .equ    00010000b       ;p24 (is sometimes an input)
bsel            .equ    00100000b       ;p25
testi           .equ    01000000b       ;p26
stopi           .equ    10000000b       ;p27
; (direction controls:  0 = output; 1 = input)
bp2ddd  =       11111100b               ;data direction default for the base
bp2dad  =       00000010b               ;default data for port 2 base
ep2ddd  =       11101000b               ;data direction default for the extension
ep2dad  =       00001011b               ;default data for port 2 extension
;........................ PORT 3 ....................
bumheldi        .equ    00000010b       ;p31
eoffhooki       .equ    00000010b       ;p31
msgi            .equ    00000100b       ;p32
;p33 used as reference input ;port macro definitions:
pset    .macro  pm1,pm2                 ;set port bits
        or      pm1, # pm2
        .endm pclr    .macro  pm1,pm2                 ;clear port bits
        and     pm1, #^c pm2
        .endm p2set   .macro  pm1                     ;set port2 bits
        or      p21, # pm1
        ld      r2, p21
        .endm p2clr   .macro  pm1                     ;clear port2 bits
        and     p21, #^c pm1
        ld      r2, p21
        .endm p2out   .macro  pm1                     ;setup direction of port2 to outputs
        and     p2m1, #^c pm1
        ld      p2m, p2m1
        .endm p2in    .macro  pm1                     ;setup direction of port2 to inputs
        or      p2m1, # pm1
        ld      p2m, p2m1
        .endm ; Power fail indicator bytes
CPWR1           .EQU    05Ah            ;BATTERY BACK UP DETECTORS they get
CPWR2           .EQU    0A5h            ;written out and checked for upon power on DEFKEY1         =       0AAH            ; DEFAULT KEY ONE
DEFKEY2         =       05FH            ; DEFAULT KEY TWO ; IRQ identifiers
T0IRQ   .EQU    010h    ; irq4
TLIRQ   .EQU    020h    ; irq5
MSGIRQ  .EQU    000h
; Message communication constants
STR     .EQU    00000101b       ;Preamble for transmitting key and status info
DATALEN .EQU    5               ;Number of bytes sent: 1-START 2-KEY 1-STATUS 1-pulse length
NUMBITS .EQU    DATALEN * 8     ;Number of bits sent in key sequence
NUMGOOD .EQU    (DATALEN-1) * 8 ;MIN number of bits IN 'GOOD' DATA ; Parametrics of the message data stream
; based upon the half bit time of 105 spaced multiples of 4th root of 2 apart
BIT_T_MIN       .EQU    84              ;88 computed
BIT_T_H         .EQU    105             ;half bit time
BIT_T_MAX       .EQU    125
BIT_T_OH        .EQU    148             ; 1.5 pulse time for stop indication
BIT_T_2MIN      .EQU    177
;the full bit time is: 210
BIT_T_2MAX      .EQU    252             ;250 computed
```

```
; message type identifiers
ID_ACK          .EQU    01h     ;requests and acks audio path
ID_UNACK        .EQU    02h     ;indicates the pending release of the line
ID_RING         .EQU    04h
ID_FLASH        .EQU    08h     ;pulse the co line for .5 sec
ID_KEYREQ       .EQU    10h
ID_HANG         .EQU    20h
ID_HOLD         .EQU    40H     ; put the line on hold
ID_PULSE        .EQU    80h     ; identifies pulse count
ID_UNRING       .EQU    80h     ; identifies to exts to stop ringing RINGMAX         =       90      ; t0 cycles in 15 hz signal
RINGMIN         =       18      ; t0 cycles in 70 hz signal
RINGCY          =       3       ; cycles counted on the line to detect!

;Data register locations
; r0: port 0
; r1: port 1
; r2: port 2
; r3: port 3
; r4: temp variable used all over but in interrupts
; r5:
temp0   =       r4
temp1   =       r5
; r6: Used by the receive interrupt routines
; r8-9 used by send_msg routine as params
; r8,9 used by ext pulse routine
trfl0   =       r7      ;time ring signal fell last
trfl1   =       r8
trrl0   =       r9      ;time ring signal rose last
trrl1   =       r10
rcc     =       r11     ;ring cycle counter
temp2   =       r12
temp3   =       r13     ; ext
pgmt    =       r13     ; base program indicator timer
time1   =       r14     ; t0 cycle counter ho
time0   =       r15     ; t0 cycle counter lo
; start the data variables above the working registers
msgio   .equ    10h     ; shift register for receive and transmit
                        ; reserve 5 bytes for above
pwr1    .equ    15h     ; power indicator byte 1
key     .equ    16h     ; the key is saved here
                        ; reserve 2 bytes for key
p2mi    .equ    18h     ; "image" register for p2m
p2i     .equ    19h     ; "image" register for p2
rngwas  =       1ah     ; ring level was
good    .equ    1bh     ; good data flag/counter
;1ch is available
;1dh is available
pwr2    .equ    1eh     ;power indicator byte 2
ind     .equ    1fh     ;eight bits for flags    datawas,middle,etc.

;IND POINTERS
PGM     .EQU    001h
MIDDLE  .EQU    004h    ;MIDDLE OF BIT INDICATOR for receive routine
MAIL    .EQU    020h ;*****************************************************************
;**             Begining of ROM
;**     Interrupt vectors come first, then code begins as 0Ch
;**     Set up the stack and register pointers.
;**     Test the base/extension input and jump to the appropriate place.
;**
;*****************************************************************
vectors
        .org    00h
        .word   ivec0
        .word   ivec1
        .word   ivec2
        .word   ivec3
        .word   ivec4
        .word   ivec5

.org    0ch             ; execution starts at 0ch
start                           ;This is where the reset begins execution.

; initialize the control registers
        di
        ld      p01m, #06dh     ; default value upon reset (Internal Stack - P0 inputs)
        ld      sph, #0         ; set the stack pointer
        ld      spl, #080h      ; stack at the top of free memory
        srp     #0              ; use the lower memory as registers
;ports are now working registers, i.e. R0 = P0, R1 = P1, R2 = P2, R3 = P3
; this will not be changed throughout the program
; interrupt priority
        ld      ipr, #01ch      ; interrupt priority register
                                ; irq # = highest priority first
                                ;    2 - stop!
                                ;    0 - msgi
```

```
                              ;     5 - t1 (timer 1)
                              ;     3 - no connect (P30 - Sin)
                              ;     4 - t0 (timer 0) (Sout)
                              ;     1 - no connect (P33)
        ; interrupt mask
        ld      imr, #089h      ; Enable 0 and 3 for msgi
        ld      irq, #00        ; clear any pending ; set up the timers
;latest operating frequency = 5.46 Mhz
; timer freq = Fosc  / 2 / 4 / pre / ta
; 1.336 kHz = 5.46M / 2 / 4 / 2 / 256
; period = 747.45 us
PRESC   =       2
TOPRE   =       PRESC  < 2 | 1           ; continuous mode
T1PRE   =       PRESC  < 2 | 2           ; internal, single pass mode ld      pre0, #TOPRE
        ld      pre1, #T1PRE
        ld      t0, #0           ; start module 256 t0 interrupts
        ld      t1, #0           ; used for period measurement
        ; timer mode register
        ld      tmr, #0fh        ; start as down counters load and enable ; test for base or extension
        ld      p2m, #0ffh       ;make sure all p2 is inputs
        tm      r2, #base1       ;are we a base?
        jp      z, extension     ;jump if not
;*****************************************************
;********************* BASE ROUTINE ******************
;*****************************************************
;Initialize the I/O ports
        ld      r0, #bp0dad
        ld      p01m, #06ch      ; make port 0 an output + internal stack
;'Image' registers are used because read modify write instructions don't
; give correct results for P2M and P2 (and others) ie: or p2m,#80h
        ld      p2mi, #bp2ddd    ;set up the port 2 mode image register
        ld      p2m, p2mi        ;set up port 2 mode to match
        ld      p2i, #bp2dad     ;set up the port two latch image register
        ld      r2, p2i          ;set up the latch for port 2
        ld      p3m, #03h        ; port three input set to analog
                                 ; port two pull-ups active
        clr     ind              ; clear all of the indicators
        ei                       ; allow the interrupts to appear in irq see pg 130 of z8 tech man
;(testmode calls debounce routine that uses timer0)
;check to see if should go to test mode (user pressing button on pwr on)
        tm      r2, #pshbta1
        jp      nz, btestmode ;Check the power indicators to see if still there
        cp      pwr1, #CPWRI     ; is first power indicator there?
        jr      ne, pwrfail      ; no - jump to start up routine
        cp      pwr2, #CPWR2     ; second?
        jr      eq, main1        ; yes, skip program routine
pwrfail
        ld      key, #DEFKEY1    ; set up default key
        ld      key+1, #DEFKEY2
        ld      pwr1, #CPWR1     ; save the power fail indicator
        ld      pwr2, #CPWR2
        jr      main1
setkey  ;jump in here if pgm button pressed later on
        pset    r0, ledon        ; turn off the led
        ld      key, t0          ; Get the first number from the timer
        call    debou
pb21
        tm      r2, #pshbta1     ; wait for the switch to release
        jr      nz, pb21
        ld      key+1, t0        ; Get the second number from the timer
        call    debou
pgmr
        or      ind, #PGM        ; in pgm mode
        pclr    r0, ledon        ; turn on the led
;set up FOR 06 xx xxh cycles or "five minutes in three bytes
        ld      pgmt, #006h
        clr     time0
        clr     time1
main1
        tm      r2, #base1       ; restart if stumbled onto the wrong code
        jp      z, start
        ld      rngmss, r2       ; save the condition of the ring line
        and     rngmss, #bringi
        p2set   bpulseo
        ei
main00
        ld      rcc, #RINGCT
mainw   ; loop here waiting for something to do
        tm      irq, #T0IRQ      ; t0 counted out yet
        jr      z, mainw02       ; no, jump
        and     irq, #~T0IRQ     ; clear the interrupt
        djnz    time0, mainw02   ; update the time
```

```
        djnz    time1, mainw02
        tm      ind, #PGM
        jr      z, mainw02
        djnz    pgmt, mainw02
        pset    r0, ledon       ; turn off the led
        and     ind, #^c PGM
mainw02
        tm      r2, #stopi      ; check for reset
        jp      nz, stop
        tm      r2, #pshbtni    ; check for the button
        jr      nz, setkey
        tm      ind, #MAIL      ; any messages?
        jp      nz, bparse ld      temp0, r2       ; ringing?
        and     temp0, #bringi  ; mask the pin
        ld      temp1, temp0
        xor     temp0, rngwas   ; changed?
        jr      z, mainw        ; n- loop more
        ld      rngwas, temp1   ; save the new value for later
        tm      temp1, #bringi  ; rising?
        jr      z, main10       ; n- go
        ld      temp0, trri0
        ld      temp1, trri1
        ld      trri0, time0
        ld      trri1, time1
        jr      main20
main10
        ld      temp0, trfi0
        ld      temp1, trfi1
        ld      trfi0, time0
        ld      trfi1, time1
main20
        sub     temp0, time0
        sbc     temp1, time1
        cp      temp0, #RINGMAX
        jr      ugt, main00
        cp      temp0, #RINGMIN
        jr      ult, main00
        cp      temp1, #0
        jr      ne, main00
        dec     rcc
        jr      nz, mainw
ringthing
        ld      r8, #ID_RING
        ld      temp0, #03      ; send it three times
        call    send_msg
;wait for ring to quit
rngwq
        ld      rngwas, r2      ; save the condition of the ring line
        and     rngwas, #bringi
        ld      temp2, #RINGMAX ; count cycles for maximum wait
rngwql
        tm      ind, #MAIL      ; did someone answer?
        jr      nz, rngmail     ; y- go do it
        ld      temp0, r2       ; ringing?
        and     temp0, #bringi  ; mask the pin
        xor     temp0, rngwas   ; changed?
        jp      nz, rngwq       ; y- start wait again
        tm      irq, #TOIRQ
        jr      z, rngwql
        and     irq, #^c TOIRQ
        djnz    temp2, rngwql
        ld      r8, #ID_UNRING
        ld      temp0, #03      ; send it three times
        call    send_msg
        jp      main1
rngmail
        cp      magic+3, #ID_ACK ;ack sent?
        jr      eq, bparse
        ld      r8, #ID_UNRING
        ld      temp0, #03      ; send it three times
        call    send_msg
;       jp      bparse          ;(just fall through for now)
;==================== Base Message Parser ====================
bparse  ; see if the key matches ours (only expecting key requests or line requests)
        cp      magic+1, key+0  ; see if their key matches ours
        jr      ne, isnew       ; jump if no match
        cp      magic+2, key+1  ; second byte
        jr      ne, isnew       ; jump if match
        cp      magic+3, #ID_ACK ; Ack request?
        jr      eq, back
isnew
        cp      magic+3, #ID_KEYREQ ; extension asking for key?
        jp      ne, bpexitm     ; collect the garbage and throw it away
bppgm   ;check for an key request message
        call    get_mail        ; wait for ext to send all 3
        tm      ind, #PGM       ; is this in program mode
        jp      z, bpexit       ; no, go back
        ld      r8, #ID_KEYREQ
```

```
         ld     temp0, #03        ; send it three times
         call   send_msg
         jp     bpexit
bpack
         call   get_mail
         ld     r0, #ID_ACK       ; return the ack
         ld     temp0, #03        ; send it three times
         call   send_msg
         p2set  boffhooks         ; go off hook
         pclr   r0, ledon         ; turn on led
         pclr   r0, muteo         ; enable the audio
         ei                       ; allow for more messages
bpack1   ;here we hold the line
         tm     r2, #stop1        ; check for reset
         jp     nz, stop
         tm     ind, #MAIL
         jr     z, bpack1
         cp     msgio+3, #ID_PULSE  ; pulse requested?
         jr     ne, lshang
bppulse  ; pulse the switch hook time of pulse in message
         pset   r0, muteo         ; disable the audio
         p2clr  bpulseo           ; turn off audio response control
         ld     temp0, msgio+4    ; get the value
         or     tmr, #01          ; restart at a new load
         pset   r0, ledon         ; turn off led
         p2clr  boffhooks         ; on hook
         call   dly1
         p2set  boffhooks         ; off hook
         pclr   r0, ledon         ; turn on led
         pclr   r0, muteo         ; enable the audio
         p2set  bpulseo           ; turn on audio response control
         and    ind, #~c MAIL     ; say we got the message
         ei
         jp     bpack1
lshang
         cp     msgio+1, key+0    ; key matches so tones won't kill the line
         jr     ne, bnogood       ; jump if no match
         cp     msgio+2, key+1    ; second byte
         jr     ne, bnogood       ; jump if no match
         cp     msgio+3, #ID_HOLD
         jr     eq, bphold
         cp     msgio+3, #ID_FLASH
         jp     eq, bpflash
         cp     msgio+3, #ID_HANG
         jr     eq, bphang
; throw away unrecognized message
bnogood
         and    ind, #~c MAIL     ; say we got the message
         ei
         jp     bpack1
bphang
         pset   r0, muteo         ; disable the audio
         call   get_mail
         ld     r0, #ID_UNACK
         ld     temp0, #03        ; send it three times
         call   send_msg
         call   dlycksm           ; enables the receiver when done
         tm     ind, #MAIL        ; wait for a message to appear
         jr     z, bphangup       ; did one arrive?
         cp     msgio+3, #ID_ACK  ; n- hang up the CO line
         jp     eq, bpack         ; got another ack?
bphangup                          ; y- go back
         p2clr  boffhooks         ; hang up
         pset   r0, ledon         ; turn off led
bpexitm
         call   get_mail
bpexit
         ei                       ; allow for more messages
         jp     main
bphold
         pset   r0, muteo         ; disable the audio
         call   get_mail
         ld     r0, #ID_HOLD      ; tell the exts
         ld     temp0, #03        ; send it three times
         call   send_msg          ; enables the receiver when done
         clr    temp0
         clr    temp1
         ld     temp2, #10        ; wait many minutes
bphold10
         tm     ind, #MAIL        ; wait for more mail for many minutes
         jr     nz, bphold20
         tm     r3, #bunhold1     ; unhold?
         jr     nz, bphold14      ; y- see if for real
         tm     r2, #stop1        ; check for reset
         jp     nz, stop
         tm     irq, #T0IRQ       ; t0 counted out yet?
         jr     z, bphold10       ; no, loop more
         and    irq, #~c T0IRQ
         djnz   temp0, bphold10
```

```
            djnz    temp1, bphold10
            ld      r8, #ID_HOLD
            ld      temp0, #3
            call    send_msg
            djnz    temp2, bphold10
            ld      temp1, #12       ; wait 1 sec
            clr     temp0
            call    dlychkm2
            tm      ind, #MAIL       ; if mail then see what it is
            jr      nz, bphold20
            ld      r8, #ID_HOLD
            ld      temp0, #3
            call    send_msg
            ld      temp1, #157      ; wait 30 seconds
            clr     temp0
            call    dlychkm2
            tm      ind, #MAIL       ; if mail then see what it is
            jr      nz, bphold20
            p2clr   boffhooke        ; hang up
            pset    r0, ledon        ; turn off led
            jp      main1
bphold14
            ld      temp0, #7        ; deglitch for 5 ms
bphold16    ; unhold pin went high
            tm      r3, #bunhold1    ; check for gone already?
            jr      z, bphold10      ; if gone then it was a glitch1-- go back
            tm      r2, #stop1       ; check for reset
            jp      nz, stop
            tm      irq, #T0IRQ      ; t0 counted out yet?
            jr      z, bphold16      ; no, loop more
            and     irq, #~c T0IRQ
            djnz    temp0, bphold16
            p2clr   boffhooke        ; hang up
            pset    r0, ledon        ; turn off led
            jp      main1
bphold20
            cp      magic+3, #ID_ACK ; got another ack?
            jp      eq, bpack        ;y- go back
            p2clr   boffhooke        ; hang up
            pset    r0, ledon        ; turn off led
            jp      main1            ; go pick up the mail elsewhere
bpflash
            ;pulse for .75 sec = 1003 tics -03 ebh
            p2clr   bpulseo          ; turn off audio response control
            p2clr   boffhooke        ; go on-hook
            pset    r0, ledon        ; turn off led
            ld      temp0, #0ebh
            ld      temp1, #04       ;inc this one
            call    dly2
            p2set   boffhooke        ; go off-hook
            pclr    r0, ledon        ; turn on led
            p2set   bpulseo          ; turn on audio response control
            call    get_mail
            ei
            jp      bpack1

;***********************************************************
;***************** EXTENSION ROUTINES **********************
;*********************************************************** extension       ;Initialize the I/O ports
            ld      r0, #ep0ded
            ld      p0im, #06ch      ; make port 0 an output ;'Image' registers are used because read modify write instructions don't
; give correct results for P2M and P2 (and others) ie:  or p2m,#80h
            ld      p2mi, #ep2ddd    ; load ext dat dir def
            ld      p2m, p2mi
            ld      p2i, #ep2dad
            ld      r2, p2i
            ld      p3m, #03h        ; port three always input set to analog
            clr     ind              ; clear all of the indicators
            ei                       ; allow the interrupts to appear in irq
;(testmode calls debounce routine that uses the interrupts)
; first check to see if in test mode
            tm      r2, #pshbtn1
            jp      nz, etestmode ;Check the power indicators to see if still there
            cp      pwr1, #CPWR1     ; see if first power indicator is ram
            jr      ne, epwrfail     ; no - jump to start up routine
            cp      pwr2, #CPWR2     ; second flag present
            jr      eq, emain        ; yes, go to main
epwrfail
            ld      key, #DEFKEY1    ; set up the default keys
            ld      key1, #DEFKEY2
            ld      pwr1, #CPWR1     ; show have keys
            ld      pwr2, #CPWR2
            jr      emain
eblink
```

```
            ld      pwr1, #0            ; destroy pwr ind if jumped into
            tm      r2, #pshbtn1        ; port 2 mask the push button
            jr      nz, epb1            ; button pushed branch pb1
            djnz    temp0, eblink       ; not time to blink yet
            djnz    temp1, eblink       ; not time to blink yet
            xor     r0, #ledon          ; change the light
            ld      r2, p21
            ld      temp1, #12h         ; set blink rate
            jr      eblink
epb1
            pset    r0, ledon           ; turn off the led
            call    debou
epb2l
            tm      r2, #pshbtn1        ; wait for the switch to release
            jr      nz, epb2l           ; button pushed branch pb1
            call    debou
egutkey     ; Request the key from the base
            p2clr   exmiten             ; turn on the transmitter
            call    delay               ; wait for .5 sec don't check receive
            call    delay               ; wait for .5 sec don't check receive
            ld      r0,#ID_KEYREQ       ; send the key request
            ld      temp0, #3           ; ask 3 times
            and     ind, #~c MAIL       ; remove any junk messages
            call    send_msg
            p2set   exmiten             ; turn off the transmitter
egk1
            call    dlychkm             ; wait for return of message
            tm      ind, #MAIL          ; see if msg was sent
            jr      z, eblink           ; n- go back
            call    get_mail            ; sent multiple times -- throw rest away
            cp      msgio+3, #ID_KEYREQ ; is this a key request return
            jr      ne, eblink          ; n- go back
            ld      key+0, msgio+1      ; save the keys
            ld      key+1, msgio+2      ; save the keys
            ld      pwr1, #CPWR1        ; show have keys
            ld      pwr2, #CPWR2        ; show have keys
            pclr    r0, ledon           ; turn on the light (indicate we got it!)
            call    delay
            pset    r0, ledon           ; turn off the light
emain
            pset    r0, muteo           ; turn off the audio
            p2in    msgo                ; make message input (hi-z)
            p2set   chvon               ; turn off ring voltage
            pset    r0, ledon           ; turn off light
            p2set   exmiten             ; turn off xmit
            tm      r2, #bsei           ; restart if wrong unit
            jp      nz, start
            ei
emain1
            tm      r2, #stop1          ; check for stop
            jp      nz, stop
            tm      r2, #pshbtn1        ; check for button
            jr      nz, egetkey
            tm      ind, #MAIL          ; check for messages
            jp      nz, eparse
            tm      r3, #offhook1       ; check for off hook
            jr      z, emain1           ; this time jump if not present
eoh         ; Extension PHONE IS OFF HOOK enters from ring routine also
            pset    r0, muteo           ; disable audio (if come from ring)
            p2clr   exmiten             ; turn on the transmitter
            call    delay               ; wait for .5 sec don't check receive
epuhfp
            ld      r0, #ID_ACK         ;REQUEST AN ACK
            ld      temp0, #3           ; ask 3 times
            call    send_msg            ; enables mail
            call    dlychkm
            tm      ind, #MAIL          ; check for mail
            jr      z, epoh0
            cp      msgio+3, #ID_ACK    ;ack returned?
            jr      eq, eonward
            call    get_mail            ; throw it away
epoh0
            ld      r0, #ID_ACK         ;REQUEST AN ACK again
            ld      temp0, #3           ; ask 3 times
            call    send_msg
            call    dlychkm
            tm      ind, #MAIL          ; check for mail
            jr      z, epoh1
            cp      msgio+3, #ID_ACK    ;ack returned?
            jr      eq, eonward
            call    get_mail            ; throw it away
epoh1l
            ld      r0, #ID_NAME        ; in case base saw us
            ld      temp0, #3           ; snd msg 3 times
            call    send_msg            ;(base returns an unack)
            p2set   exmiten             ; turn off the transmitter
            ld      temp1, #5           ; chirp four times and wait for on-hook
epoh05
            ld      temp0, #40
            pclr    r0, muteo           ; turn on the audio
```

```
epoh10   ;(beep)
         tm      r3, #eoffhooki   ; are we still off hook?
         jp      z, epoh35        ; n- go try again
         tm      irq, #TOIRQ      ; t0 counted out yet?
         jr      z, epoh10        ; no, loop more
         and     irq, #^c TOIRQ
         xor     r0, #ledon       ; change the light (make audio tone)
         ld      r2, p2!
         djnz    temp0, epoh10
         ld      temp0, #60
epoh20   ;(pause beep)
         tm      r3, #eoffhooki   ; are we still off hook?
         jr      z, epoh35        ; n- go try again
         tm      irq, #TOIRQ      ; t0 counted out yet?
         jr      z, epoh20        ; no, loop more
         and     irq, #^c TOIRQ
         djnz    temp0, epoh20
         djnz    temp1, epoh05    ; outter loop
         pset    r0, muteo        ; turn off the audio
epoh30
         tm      r2, #stopi       ; check for stop
         jp      nz, stop
         tm      r3, #eoffhooki   ; are we still off hook?
         jr      nz, epoh30       ; n- stick around
epoh35
         call    get_mail         ; also debounces
         ei
         jp      emain eonward
         call    get_mail         ; throw away extra messages
es_p0
         pclr    r0, muteo        ; turn on the audio
         pclr    r0, ledon        ; turn on the light
eswpulse
         tm      r2, #stopi       ; check for stop
         jp      nz, stop
         tm      r3, #eoffhooki   ; is the phone still off hook
         jr      nz, eswpulse     ; yes, wait
; phone just went on-hook
         clr     r9               ; set up counter
eswpul2  ;remove bounce and deglitch
         tm      r2, #stopi       ; check for stop
         jp      nz, stop
         tm      irq, #TOIRQ      ; counted out yet
         jr      z, eswpul2       ; no, wait for counter
         and     irq, #^c TOIRQ   ; clear the irq
         inc     r9
         cp      r9, #54          ; at least 40 ms?
         jr      ult, eswpul2     ; no, wait some more
         tm      r3, #eoffhooki   ; still on hook?
         jr      nz, eswpulse     ; n- go back and wait (just a glitch)
         pset    r0, muteo        ; turn off audio
         pset    r0, ledon        ; turn off the light
; measure time up to 90 ms for dial pulses (60 ms. USA, 67 ms others)
eswpulse1
         tm      r3, #eoffhooki   ; is the phone still on hook
         jr      nz, dialdone     ; no, tell the base how long off
         tm      r2, #stopi       ; check for stop
         jp      nz, stop
         tm      irq, #TOIRQ      ; counted out yet
         jr      z, eswpulse1     ; no, wait for counter
         and     irq, #^c TOIRQ   ; clear the irq
         inc     r9
         cp      r9, #120         ; less than 90 ms?
         jr      ult, eswpulse1   ; no, wait some more
; check for 'flash', 'hold' or 'hangup'
         ld      temp0, #4        ; if gone longer than 3/4 sec hangup
eswp20   ;(still on hook for first time)
         tm      r3, #eoffhooki
         jr      nz, eswp50       ; jump out of here on first fall click v^
         tm      r2, #stopi       ; check for stop
         jp      nz, stop
         tm      irq, #TOIRQ
         jr      z, eswp20
         and     irq, #^c TOIRQ
         inc     r9
         jr      nz, eswp20
         djnz    temp0, eswp20
; send msg to base that we are hanged up
         ld      r0, #ID_HANG
         ld      temp0, #3        ; snd msg 3 times
         call    send_msg         ;(base returns an unack)
         p2set   exmitxo          ; turn off xmtr
         call    diychim          ; pick up the smack
         call    get_mail
         ei                       ; turn on the receiver
         jp      emain            ; now quit
dialdone ;takes long enough to debounce the thing
         ld      r0, #ID_PULSE
```

```
         ld    temp0, #1           ; ask 1 time
         call  send_msg            ; send the message
         jp    eswp0
eswp50 ; could be flash or hold (now off hook)
         clr   r9
         ld    temp0, #4           ; if not back in 3/4 sec then flash
eswp52 ; remove bounce
         tm    r2, #stopi          ; check for stop
         jp    nz, stop
         tm    irq, #T0IRQ         ; counted out yet
         jr    z, eswp52           ; no, wait for counter
         and   irq, #^c T0IRQ      ; clear the irq
         inc   r9
         cp    r9, #120            ; 90 ms?
         jr    ult, eswp52         ; no, wait some more
eswp60 ;(still off hook)
         tm    r3, #eoffhooki
         jr    z, eswp70
         tm    r2, #stopi          ; check for stop
         jp    nz, stop
         tm    irq, #T0IRQ
         jr    z, eswp60
         and   irq, #^c T0IRQ
         inc   r9
         jr    nz, eswp60
         djnz  temp0, eswp60
         ld    r0, #ID_FLASH       ; if falls through assume flash
         ld    temp0, #3           ; ask 3 times
         call  send_msg            ; send the message
         jp    eswp0
eswp70 ; hold wanted (on hook again)
         ld    r0, #ID_HOLD
         ld    temp0, #3
         call  send_msg            ; long enough to debounce it
         p2set exmiten             ; turn off xmtr
         call  dlychim ; pick up the unack
         call  get_mail
         ei                        ; turn on the receiver
         clr   temp0
         ld    temp1, #5           ;set up for 3/4 sec
eswp80
         tm    r3, #eoffhooki      ; wait for off-hook within 3/4 sec
         jr    nz, eswp85
         tm    r2, #stopi          ; check for stop
         jp    nz, stop
         tm    irq, #T0IRQ
         jr    z, eswp80
         and   irq, #^c T0IRQ
         djnz  temp0, eswp80
         djnz  temp1, eswp80       ; fall through if hung up for good
eswp85
         call  debou
         pclr  r0, mutee           ; turn on the audio
eswp90
         tm    r3, #eoffhooki      ; wait for on-hook (guy hangs up his phone)
         jr    z, eswp100
         tm    r2, #stopi          ; check for stop
         jp    nz, stop
         tm    irq, #T0IRQ
         jr    z, eswp90
         and   irq, #^c T0IRQ
         xor   r0, #ledon          ; change the light (make audio tone)
         ld    r2, #21
         jr    eswp90
eswp100
         pset  r0, mutee           ; turn off the audio
         pset  r0, ledon           ; turn off the light
         call  debou
         jp    emain               ; now quit
;************* Extension Parse MESSAGES ROUTINE *****************
eparse   ; see if the key matches ours
         cp    magic+1, key+0      ; compare the 2 bytes of the stored to rec.
         jp    ne, epexitm         ; jump if no match
         cp    magic+2, key+1      ; second byte
         jp    ne, epexitm         ; jump if no match
         cp    magic+3, #ID_RING   ; is it a ring
         jr    eq, epring
         cp    magic+3, #ID_HOLD   ; is it holding? (signal the user)
         jr    eq, ephold
         cp    magic+3, #ID_ACK
         jp    eq, epack
; could be key request, unack, unring...
         jp    epexitm             ; enables ints
; *** ring routines ***
;ring routine  50% DUTY 25 HZ
ptime   .equ   25        ;20ms pulse width ringsub
         pset  r0, mutee           ; turn off the audio (used for caller-id)
```

```
rsloop
        p2clr   eppven          ; turn off Isource
        ld      temp0, #2
        call    dly1
        p2clr   chven           ; turn on hv
        ld      temp0, #ptime
        call    dly1
        p2set   chven           ; hv - off
        ld      temp0, #2
        call    dly1
        p2set   eppven          ; turn on Isource
        ld      temp0, #ptime
        call    dly1
        tm      r3, #eoffhooki  ; check if the phone is off hook
        jr      nz, rs10
        tm      ind, #MAIL
        jr      nz, rs10
        djnz    temp2, rsloop   ; finished with ring? no - ring more
rs10
        ret
;* * ring the extension phone
rtime   .equ    52              ;ring time = 2.0 sec++
epring
        call    get_mail
        ei                      ;allow for unring commands
        ld      temp2, #rtime
        call    ringsub
        tm      r3, #eoffhooki  ; check if the phone is off hook
        jp      nz, epoh
        tm      ind, #MAIL      ; did the mail bump us out?
        jp      nz, eparse
        jp      epexit          ; finished hidrtime        .equ    3       ;ring for short bursts
epnold
        call    get_mail
        ld      temp3, #3       ; ring the phone 3 times
epnol
        ld      temp2, #hidrtime
        call    ringsub
        tm      r3, #eoffhooki  ; check if the phone is off hook
        jp      nz, epoh
        ld      temp0, #0ch     ; pause for stime = ptime * 2
        ld      temp1, #02      ; inc this one
        call    dlychkh2
        tm      r3, #eoffhooki  ; check if the phone is off hook
        jp      nz, epoh
        djnz    temp3, ephol    ; ring a few times
        jr      epexit          ; when finished exit epack   ; if here the phone is on hook and an ack received--wait for unack
        call    get_mail        ; pick up the rest of the messages
        ei                      ; allow for more to come
epack05
        pclr    r0, mrtao       ; allow for audio tone
        ld      temp0, #050h
        ld      temp1, #002h    ; inc this byte
epack10
        tm      ind, #MAIL      ; mail?
        jr      nz, epack20     ; r- go on
        tm      r2, #stop1      ; check for stop
        jp      nz, step
        tm      irq, #T0IRQ     ; t0 counted out yet?
        jr      z, epack10      ; no, loop more
        and     irq, #^c T0IRQ
        xor     r0, #leden      ; change the light (make audio tone)
        ld      r2, p21
        djnz    temp0, epack10
        djnz    temp1, epack10
        pset    r0, mrtao       ; turn off the audio
        ld      temp0, #050h
        ld      temp1, #002h    ; inc this byte
epack12
                                ;cycle some with out any tone
        tm      ind, #MAIL      ; mail?
        jr      nz, epack20     ; r- go on
        tm      r2, #stop1      ; check for stop
        jp      nz, stop
        tm      irq, #T0IRQ     ; t0 counted out yet
        jr      z, epack12      ; no, jump
        and     irq, #^c T0IRQ
        djnz    temp0, epack12
        djnz    temp1, epack12
        jr      epack05
epack20
        pset    r0, mrtao       ; turn off the audio
        pset    r0, leden       ; turn off the light
        jp      eparse          ; go back and see what was sent
epexitm
        call    get_mail
epexit
```

```
        ei                      ;allow for more mail
        jp      emain

;=========== Subroutines used by both BASE and EXTENSION ============
;*** STOP routine
stop
        ld      p2m, #0ffh      ;make all p2 inputs
        ld      p01m, #06dh     ;make all p0 inputs
        nop
        stop
;generic single variable wait
dly1    ld      temp1, #1
        jr      dly2
;* Wait for a while 0.5s = 669 t0 cycles = 0290h
delay
        ld      temp0, #09dh
        ld      temp1, #003h    ;inc this byte
dly2    ;generic two variable wait enters here
        tm      r2, #stopi      ; check for stop
        jp      nz, stop
        tm      irq, #T0IRQ     ; t0 counted out yet
        jr      z, dly2         ; no, jump
        and     irq, #^c T0IRQ
        djnz    temp0, dly2
        djnz    temp1, dly2
        ret
;*--------------------------------------------------------------
;* Wait for 0.5++ second if there is not any mail
;*--------------------------------------------------------------
dlychkm
        ld      temp0, #0adh    ; 16 more for those waiting
        ld      temp1, #003h    ;inc this byte
dlychkm2
        tm      ind, #MAIL      ; Mail?
        jr      nz, dlychkend   ; yes, end
        tm      r2, #stopi      ; check for stop
        jp      nz, stop
        tm      irq, #T0IRQ     ; t0 counted out yet
        jr      z, dlychkm2     ; no, jump
        and     irq, #^c T0IRQ
        djnz    temp0, dlychkm2
        djnz    temp1, dlychkm2
dlychkend
        ret ;*-generic delay checking the hook status
dlychkh2
        tm      r3, #eoffhooki  ; Off hook?
        jr      nz, dlyhend     ; yes, end
        tm      r2, #stopi      ; check for stop
        jp      nz, stop
        tm      irq, #T0IRQ     ; t0 counted out yet
        jr      z, dlychkh2     ; no, jump
        and     irq, #^c T0IRQ
        djnz    temp0, dlychkh2
        djnz    temp1, dlychkh2
dlyhend
        ret ;*--------------------------------------------------------------
;*                      Wait for extra keys
;* Wait for 66 tofs = 058h = 66 ms
get_mail
        ld      temp0, #66
        call    dly1
        and     ind, #^c MAIL   ; say we got the mail
        ret
;*--------------------------------------------------------------
;*                      debounce routine
;* Wait for .1 second
;*--------------------------------------------------------------
debou
        ld      temp0, #134
        call    dly1
        ret
;*--------------------------------------------------------------
;*                      BASE TEST MODE
;* turn on the xmitter, audio, and led
;*--------------------------------------------------------------
btestmode
        pclr    r0, leden       ; turn on led
        p2set   boffhooko       ;C.O. line off-hook
        pclr    r0, mrteo       ; enable the audio
btst10  jr      btst10

;*--------------------------------------------------------------
;*                      EXTENSION TEST MODE
;* turn on the xmitter, audio, and led
;*--------------------------------------------------------------
```

```
etestmode
        p2clr   exmiton         ; turn on xmtr
        pclr    r0, ledon       ; turn on led
        pclr    r0, muteo       ; enable the audio
etml0   jr      etml0

;*********************************************************************
;*
;*                       SEND_MSG
;*
;*  Take the Start, Key, and Type bytes and send them out the keyo pin
;*        The accumulator holds the MESSAGE TYPE.
;* Note: perameter temp0 (number of times sent) is set by the calling routine
;*       param r8, r9 are the message mostly r8
;
;       Also since the receive routines would ruin the timing the receiver is
;       disabled when sending messages
;
;       Uses: temp0, temp1, msgio, and T0 in continuous mode
;*--------------------------------------------------------------------
send_msg
        di                      ; disable interrupts from messing timing or vars
        p2out   msgo            ; turn on the output
        and     tmr, #0ch       ; turn off timer0
        ld      t0, #BIT_T_H    ; 1/2 bit time
        or      tmr, #03h       ; load & start timer0
sk11
        ld      msgio+0, #STR   ; initialize the key sequence
        ld      msgio+1, key+0  ; put in the keys
        ld      msgio+2, key+1  ; put in the keys
        ld      msgio+3, r8     ; move the id byte into the message
        ld      msgio+4, r9
        ld      temp1, #NUMBITS ; transmit all of the bits
sk12
        rlc     msgio+4
        rlc     msgio+3
        rlc     msgio+2
        rlc     msgio+1
        rlc     msgio           ; carry bit used later too - do not destroy!
        jr      nc, skout0      ; if zero clear image bit
        or      p21,#msgo       ; else set the bit
        jr      skoutd
skout0
        and     p21,#^c msgo    ; clear the bit
skoutd
        tm      irq, #T0IRQ     ; time out yet?
        jr      z, skoutd       ; no, jump skoutd
        ld      r2, p21         ; output the bit
        and     irq, #^c T0IRQ  ; reset the interrupt
        xor     p21, #msgo      ; change the bit for next half
skoutd1 ;wait for the counter time
        tm      irq, #T0IRQ     ; time out yet?
        jr      z, skoutd1      ; no, jump skoutd
        ld      r2, p21         ; output the bit
        and     irq, #^c T0IRQ  ; reset the interrupt
        djnz    temp1, sk12     ; done with message? no, sk12 xor     p21, #msgo      ; change the bit for next half
        ld      t0, #BIT_T_OH   ; change to end bit 1.5 bit time
skoutd2 ;wait for the counter time
        tm      irq, #T0IRQ     ; time out yet?
        jr      z, skoutd2      ; no, jump skoutd
        ld      r2, p21         ; output the bit
        and     irq, #^c T0IRQ  ; reset the interrupt
        xor     p21, #msgo      ; change the bit for next half
skoutd3 ;wait for the counter time
        tm      irq, #T0IRQ     ; time out yet?
        jr      z, skoutd3      ; no, jump skoutd
        ld      r2, p21         ; output the bit
        and     irq, #^c T0IRQ  ; reset the interrupt
        ld      t0, #BIT_T_H    ; restore back to 1/2 bit time
        djnz    temp0, sk11     ; send msg multiple times p2in    msgo            ; make input
        ld      t0, #00         ; reset t0 for full loop
        ei                      ; allow interrupts again
        ret ;************* Interrupt RECEIVE ROUTINES *******************
; 'Owns' R6, msgio, T1, good Irq0 and Irq3
; disabled by transmitt routine and when message is received
; lasts about 60 uS.
;------------------- Falling message line routine ----------------- ivec0   ;p32 F edge msgi
        pset    r0, msgfo       ; output the new value
        ld      r6, t1          ; get the time
        or      tmr, #0ch       ; restart timer 1
; See if the transition fits within the alloted times:
        com     r6              ; count time = -(down count time)
        cp      r6, #BIT_T_2MIN ; smaller than a two?
```

```
              jr     ult, rcvcsf      ; y- check for stop or data
              cp     r6, #BIT_T_2MAX  ; smaller than 2 * max
              jr     ugt, rcvbadf     ; n - to big for data
    rcvlongf
              inc    good
              or     ind, #MIDDLE     ; set the middle indicator
              scf                     ;use for upright data
    ;         rcf                     ;use for inverted data
              rlc    msgie+4          ; move the bit into data stream
              rlc    msgie+3
              rlc    msgie+2          ; shift in the received bits
              rlc    msgie+1
              rlc    msgie+0
              jr     rcvexitf
    rcvcsf
              cp     r6, #BIT_T_MAX   ; is it a stop?
              jr     ugt, rcvstopf    ; y- goto stop routine
              cp     r6, #BIT_T_MIN   ; it is a short?
              jr     ult, rcvbadf     ; n- too small for data
              tm     ind, #MIDDLE     ; if was at edge then goto the middle routine
              jr     z, rcvlongf      ; else was at middle go to edge
              and    ind, #~c MIDDLE  ; clear middle indicator
              jr     rcvexitf
    rcvbadf
              clr    good             ; reset the data counter
              jr     rcvexitf
    rcvstopf
              cp     good, #NUMGOOD   ; Enough to be a message?
              jr     ult, rcvbadf     ; n- it's bad!
              di                      ; no more mail till this one is gone
              or     ind, #MAIL       ;say we have something
    rcvexitf
              and    irq, #~c MSGIRQ
              iret ;------------------- Rising message line routine ------------------- ivec3     ;p32 R edge msgl
              pclr   r0, msgfe        ; output the new value
              ld     r6, t1           ; get the time
              or     tmr, #0ch        ; restart timer 1
    ; See if the transition fits within the alloted times:
              com    r6               ; count time = -(down count time)
              cp     r6, #BIT_T_2MIN  ; smaller than a two?
              jr     ult, rcvcsr      ; y- check for stop or data
              cp     r6, #BIT_T_2MAX  ; smaller than 2 * max
              jr     ugt, rcvbadr     ; n - to big for data
    rcvlongr
              inc    good
              or     ind, #MIDDLE     ; set the middle indicator
              rcf                     ;use for upright data
    ;         scf                     ;use for inverted data
              rlc    msgie+4          ; move the bit into data stream
              rlc    msgie+3
              rlc    msgie+2          ; shift in the received bits
              rlc    msgie+1
              rlc    msgie+0
              jr     rcvexitr
    rcvcsr
              cp     r6, #BIT_T_MAX   ; is it a stop?
              jr     ugt, rcvstopr    ; y- goto stop routine
              cp     r6, #BIT_T_MIN   ; it is a short?
              jr     ult, rcvbadr     ; n- too small for data
              tm     ind, #MIDDLE     ; if was at edge then goto the middle routine
              jr     z, rcvlongr      ; else was at middle go to edge
              and    ind, #~c MIDDLE  ; clear middle indicator
              jr     rcvexitr
    rcvbadr
              clr    good             ; reset the data counter
              jr     rcvexitr
    rcvstopr
              cp     good, #NUMGOOD   ; Enough to be a message?
              jr     ult, rcvbadr     ; n- it's bad!
              di                      ; no more mail till this one is gone
              or     ind, #MAIL       ;say we have something
    rcvexitr
              and    irq, #~c MSGIRQ
              iret ; not expecting any of these interrupts -- all just return
    ivec1     ;p33 F edge
    ivec2     ;p31 F edge
    ivec4     ;t0
    ivec5     ;t1 iret
              .end
```

APPENDIX B

SCHEMATIC DIAGRAMS FOR

SECURE ACCESS BASE AND EXTENSION UNITS

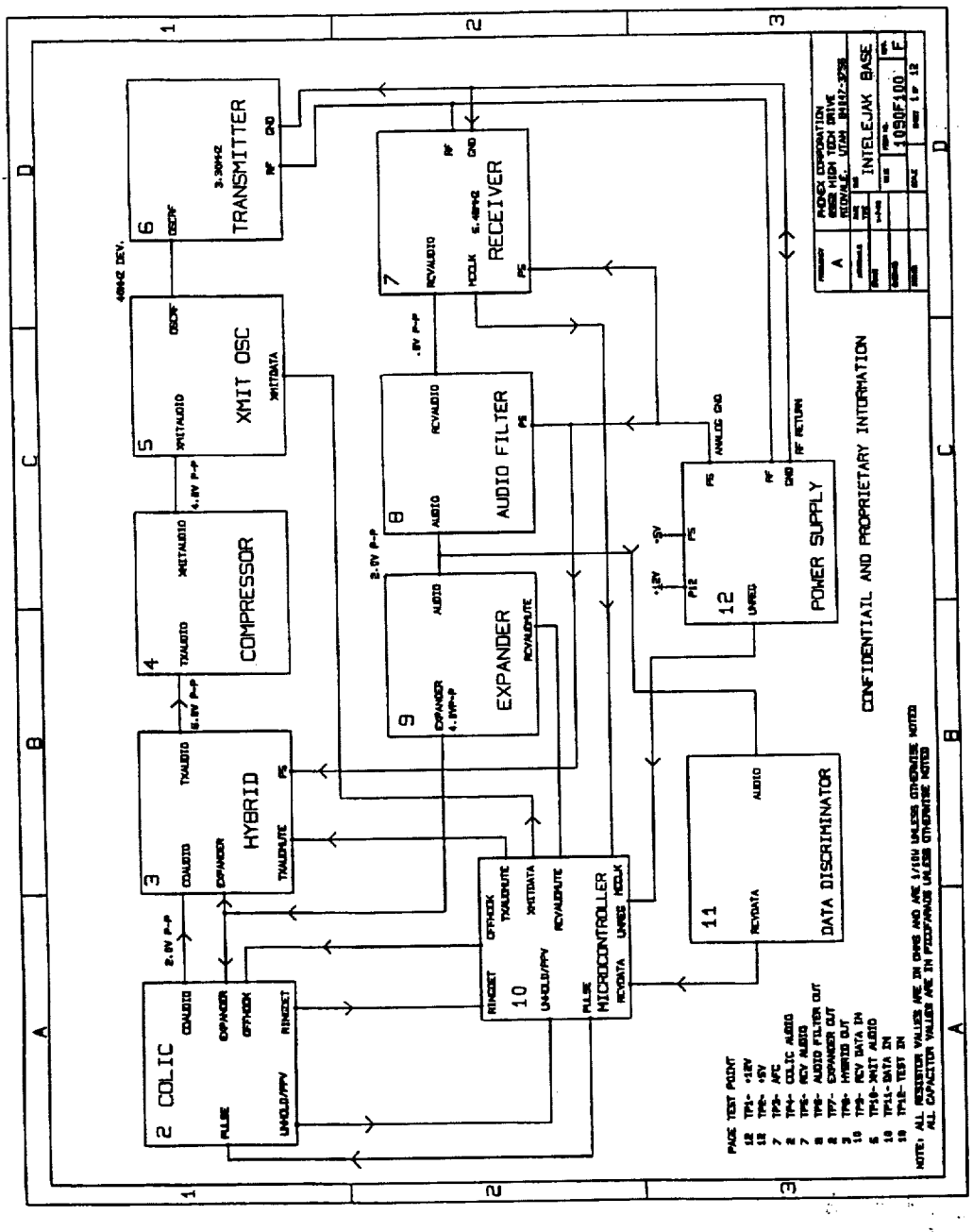

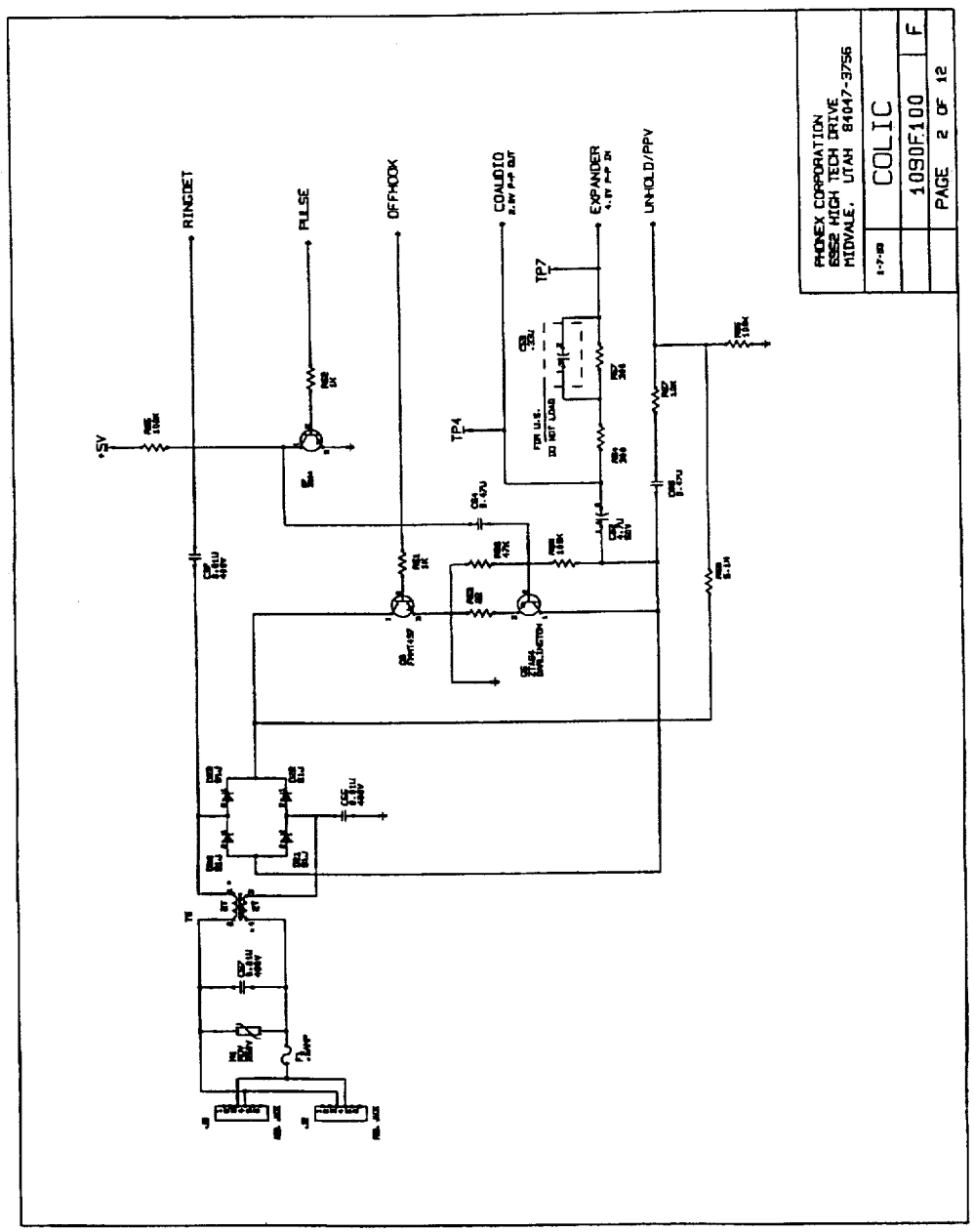

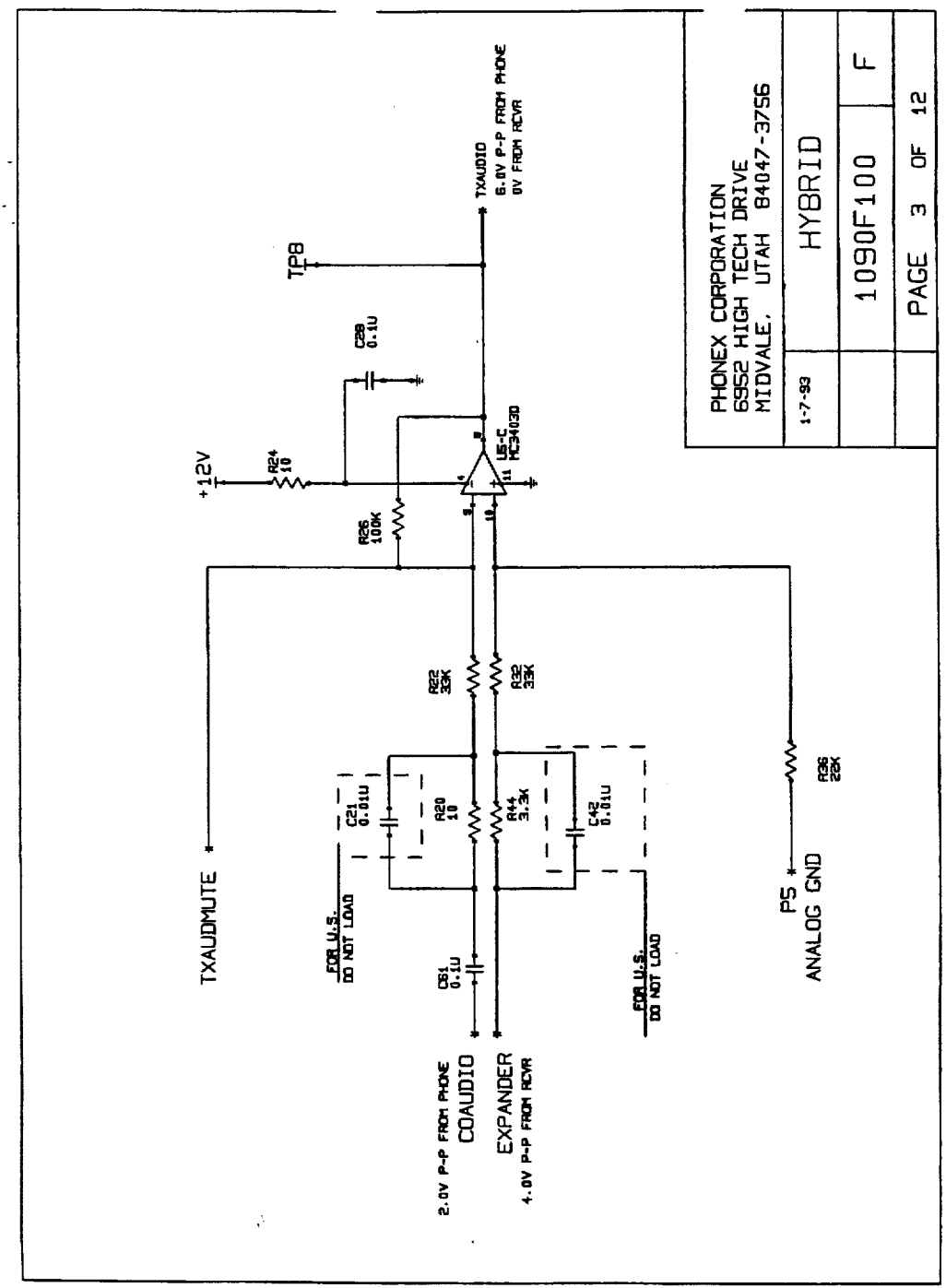

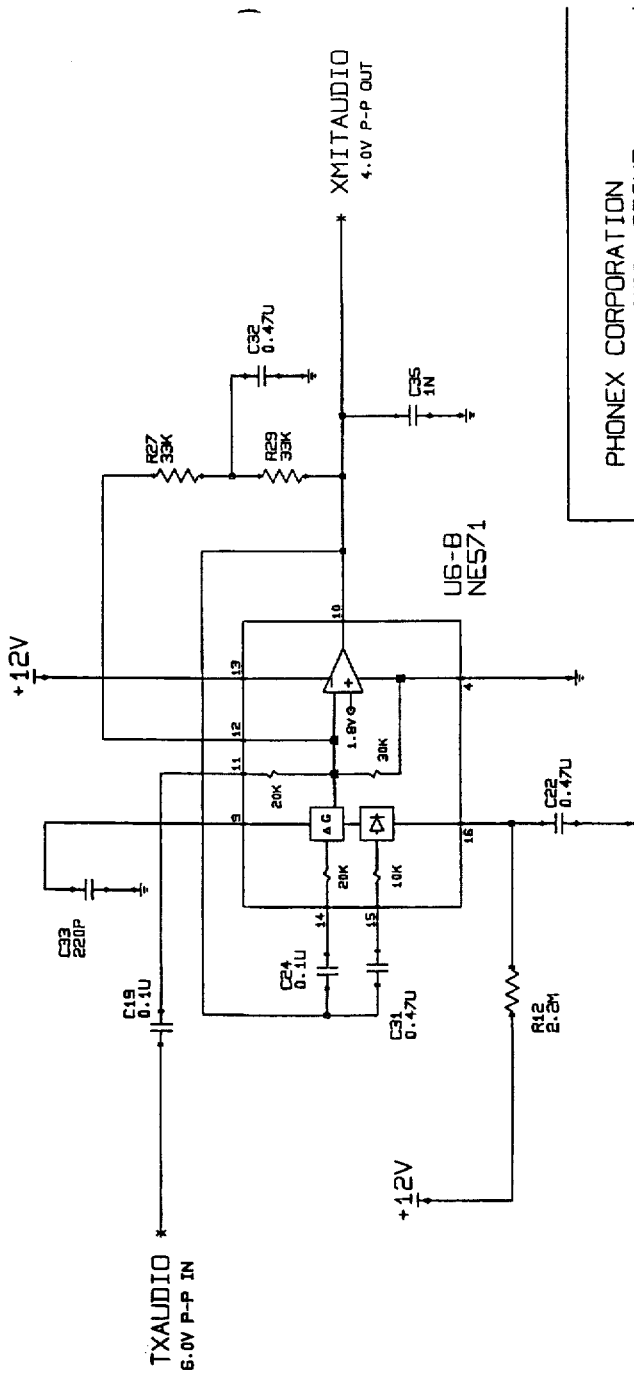

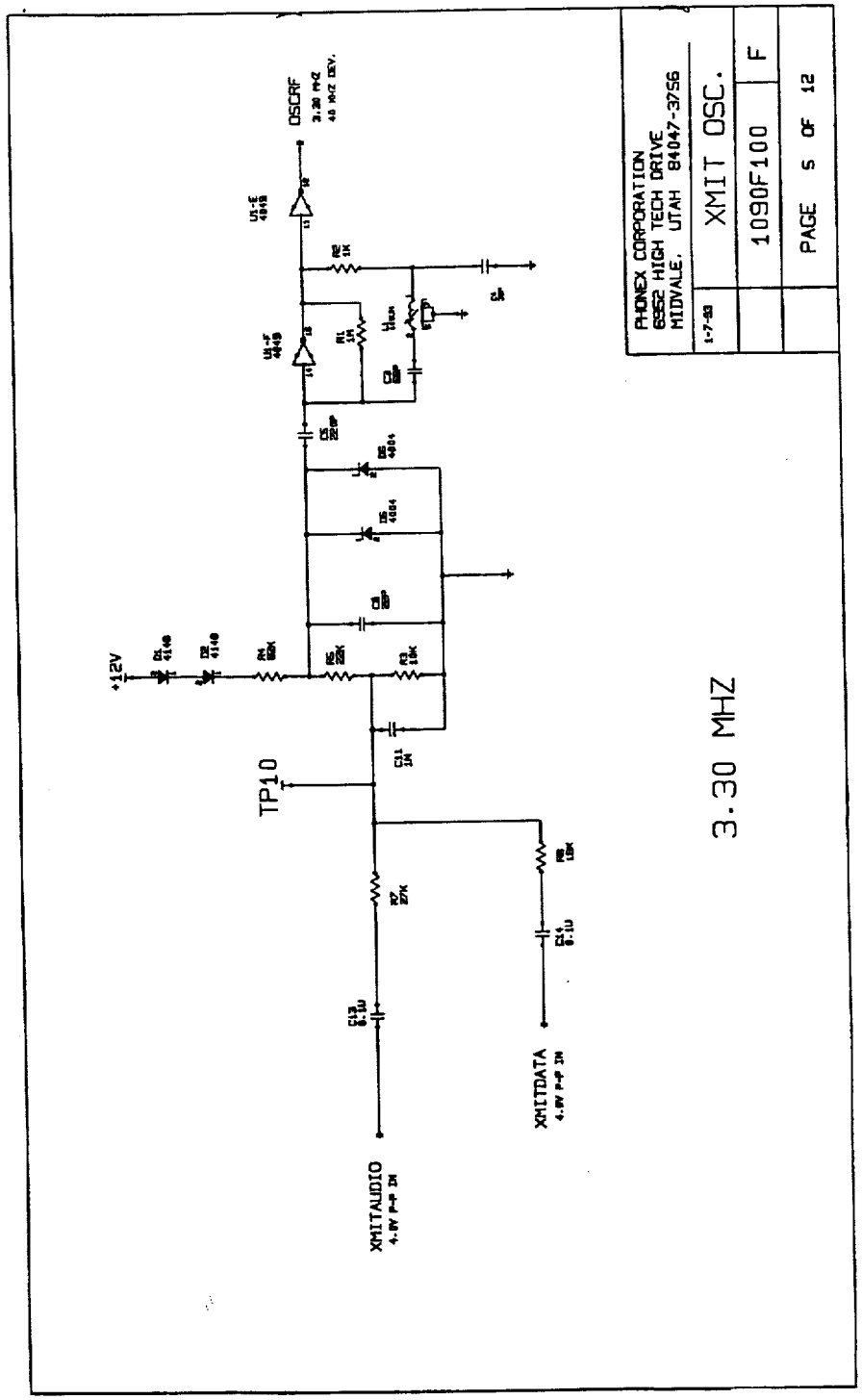

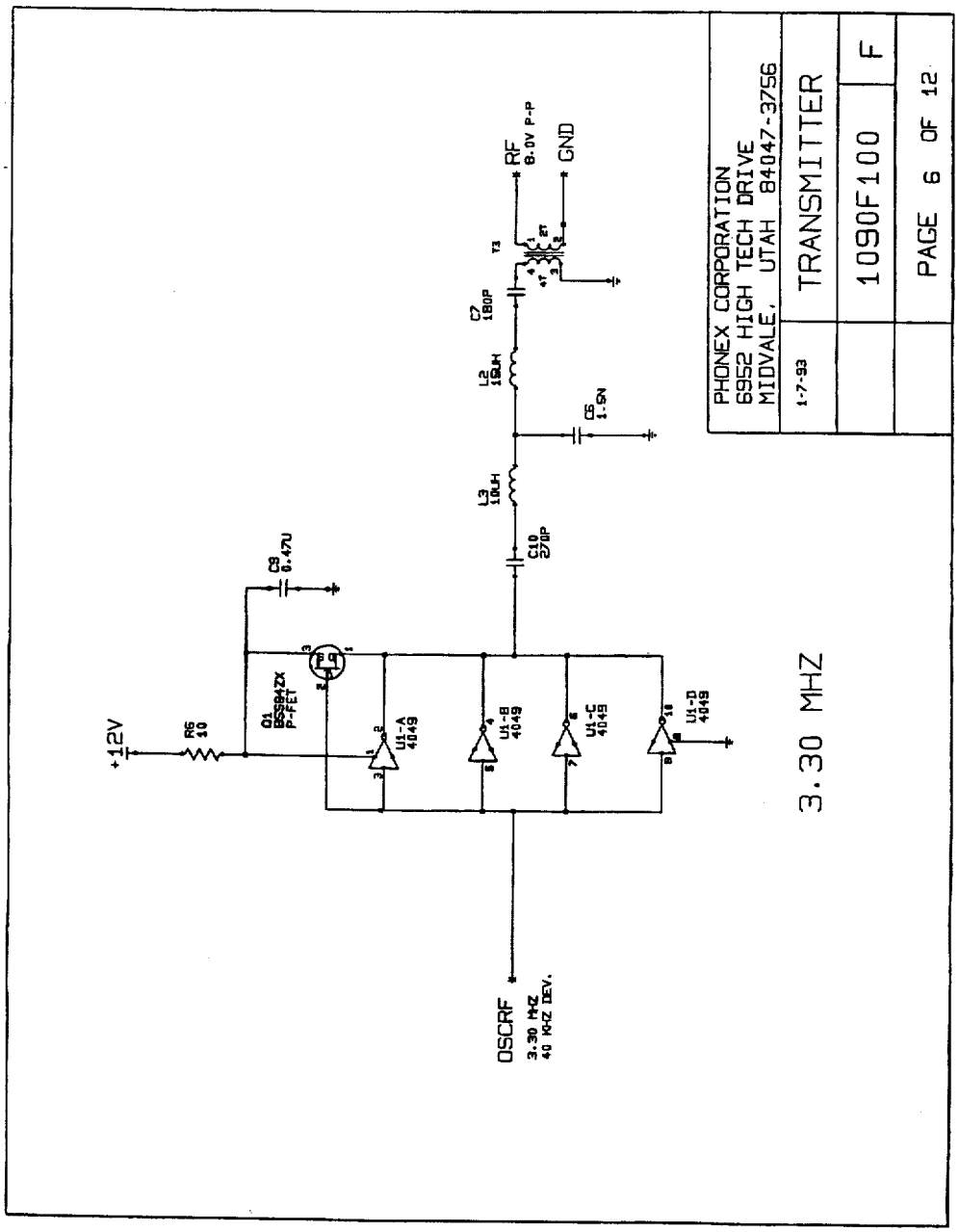

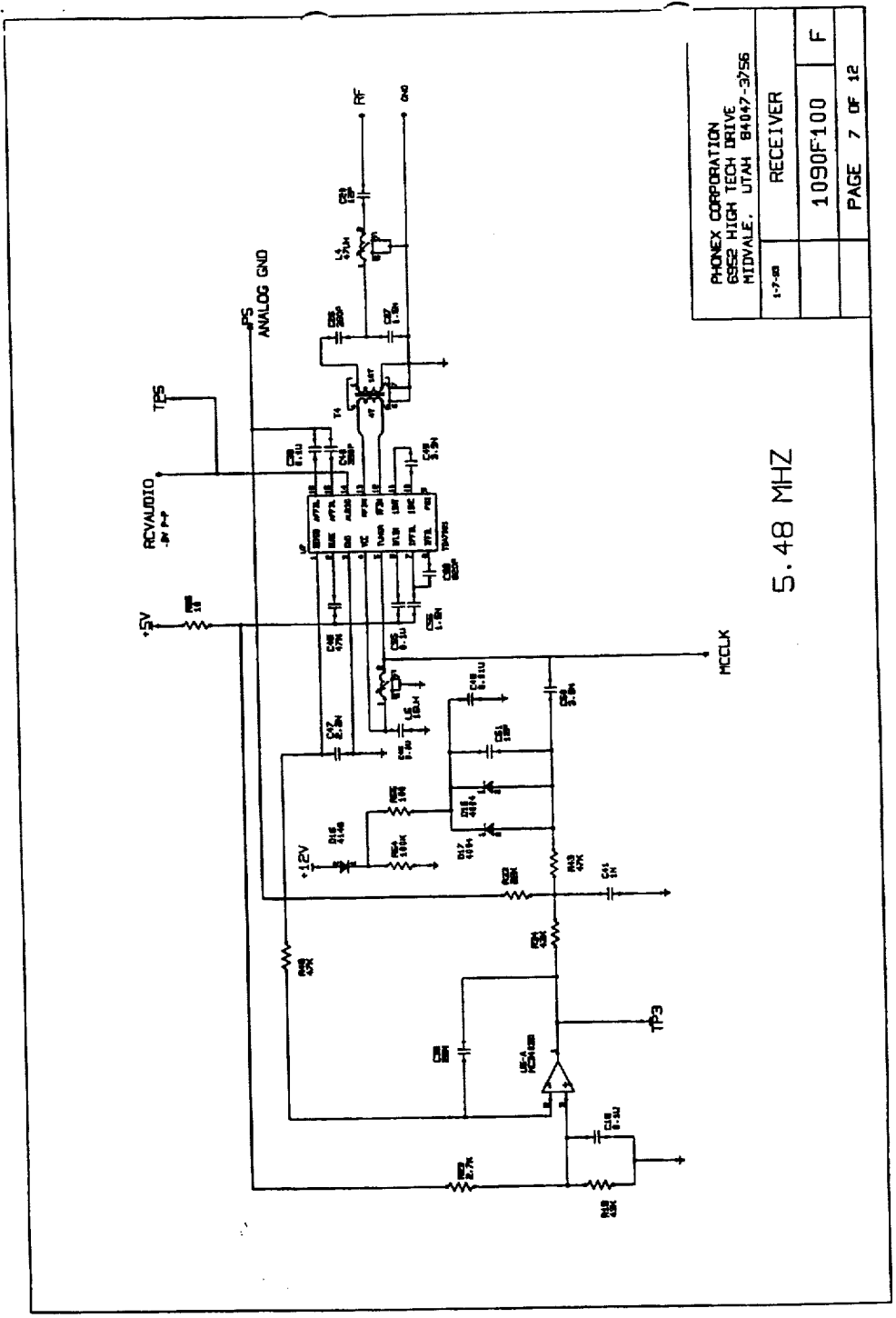

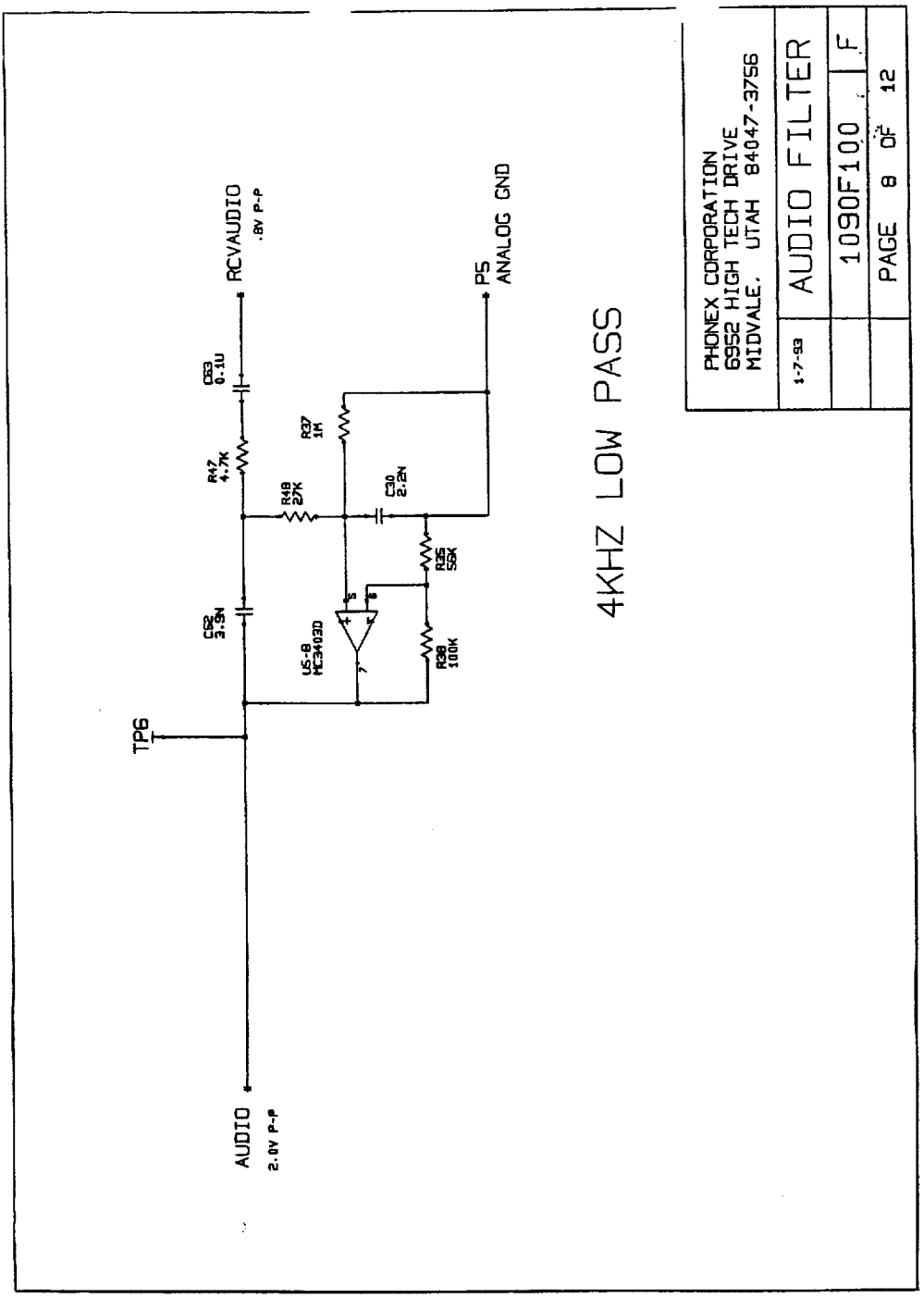

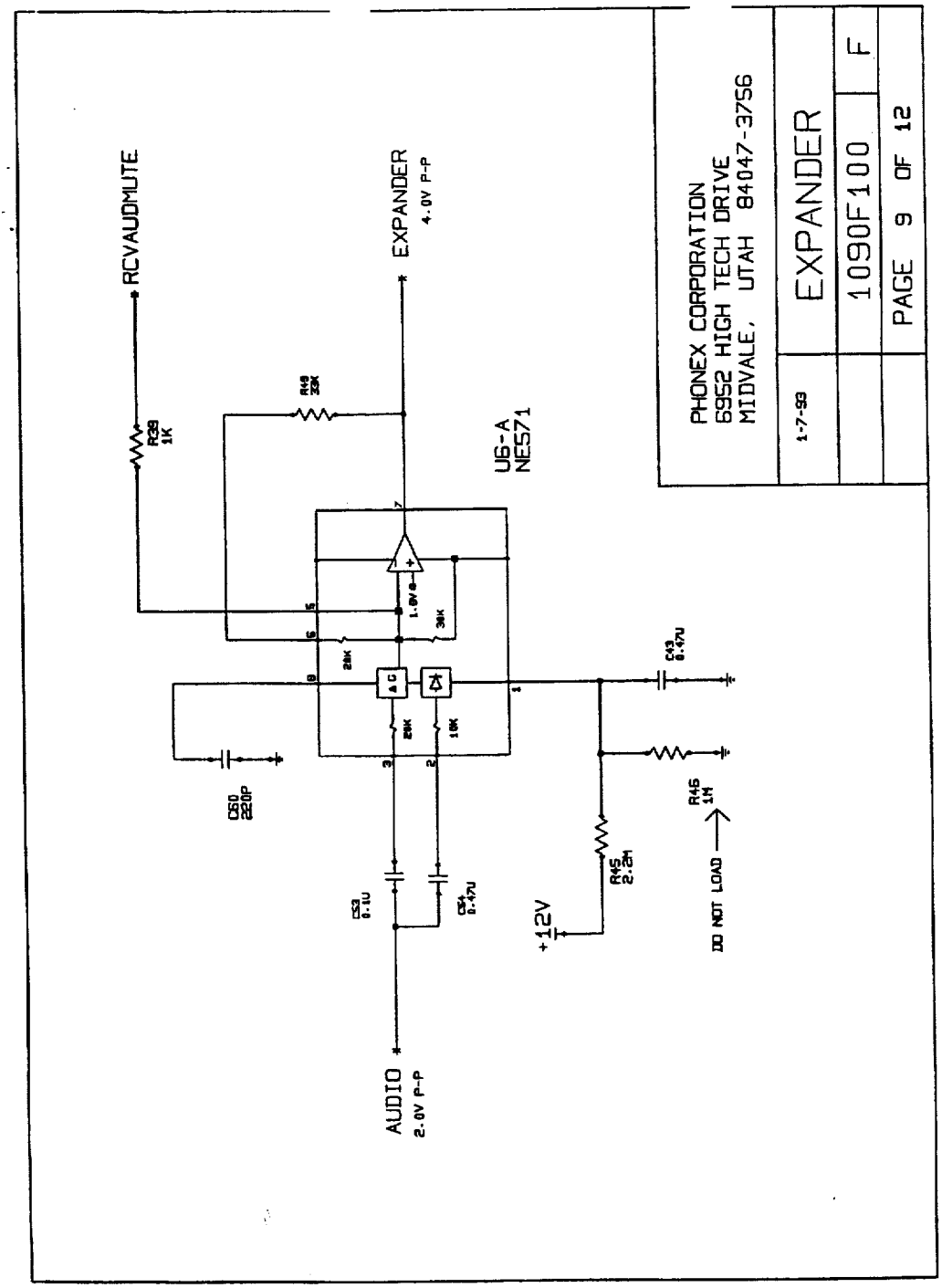

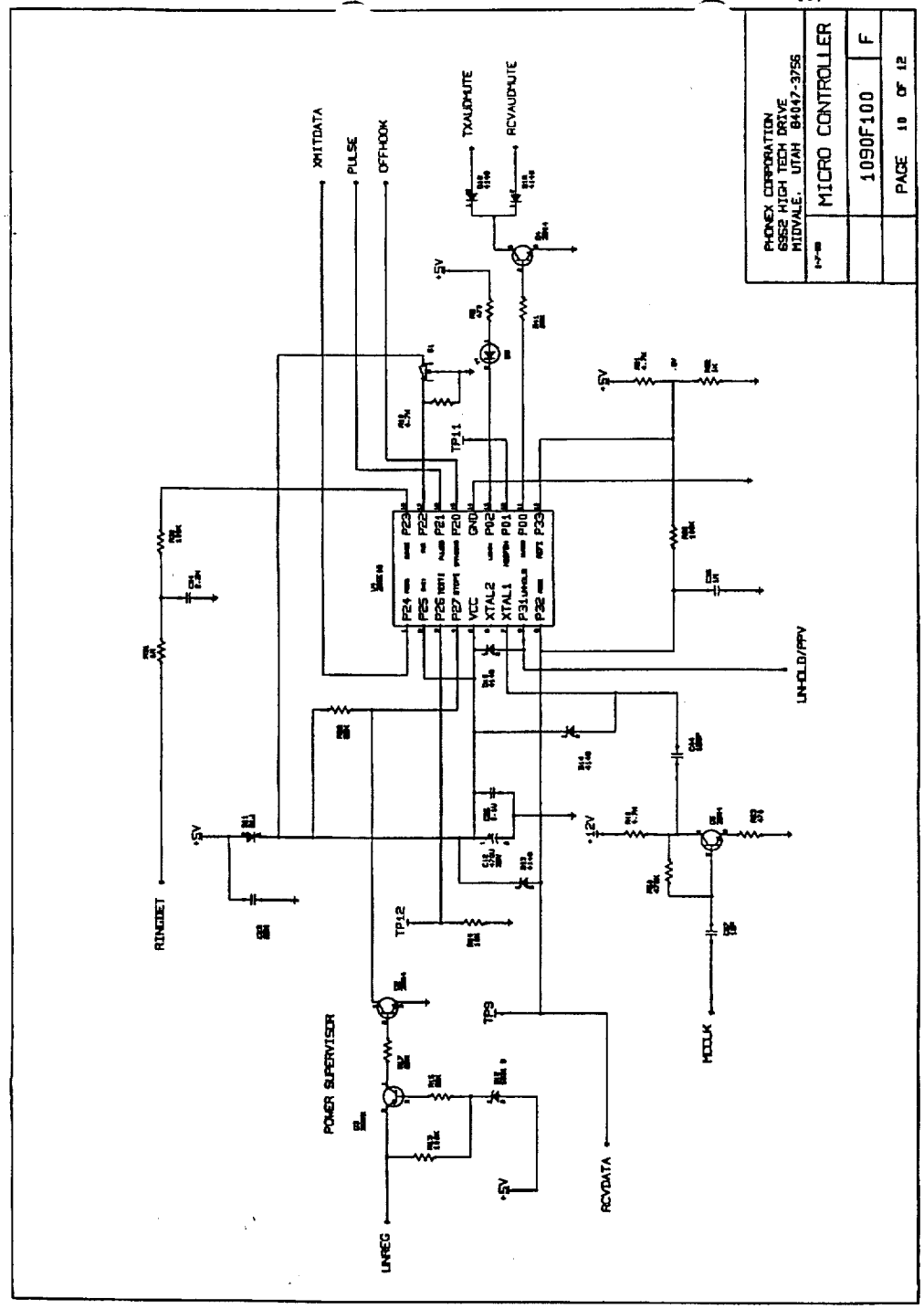

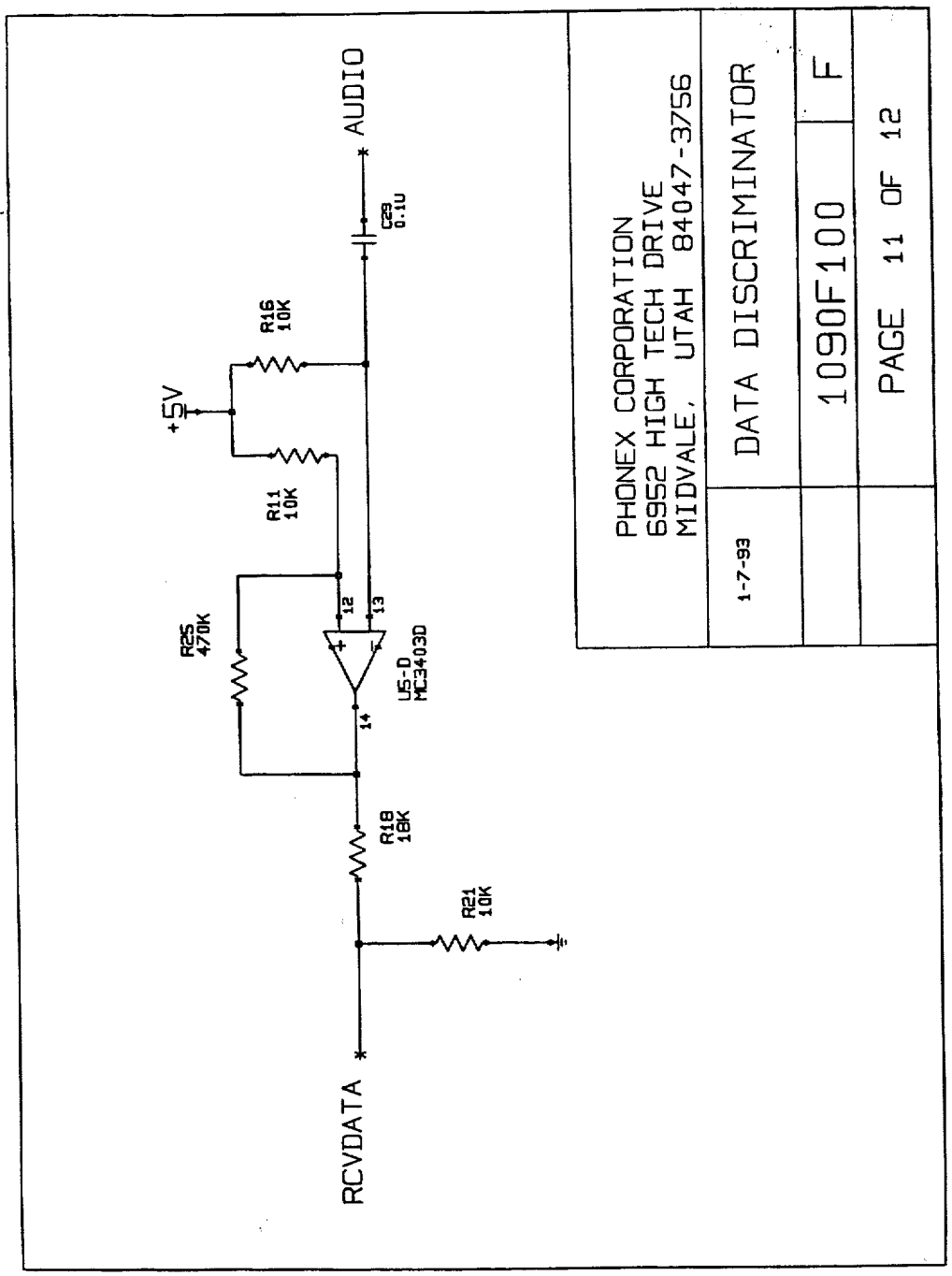

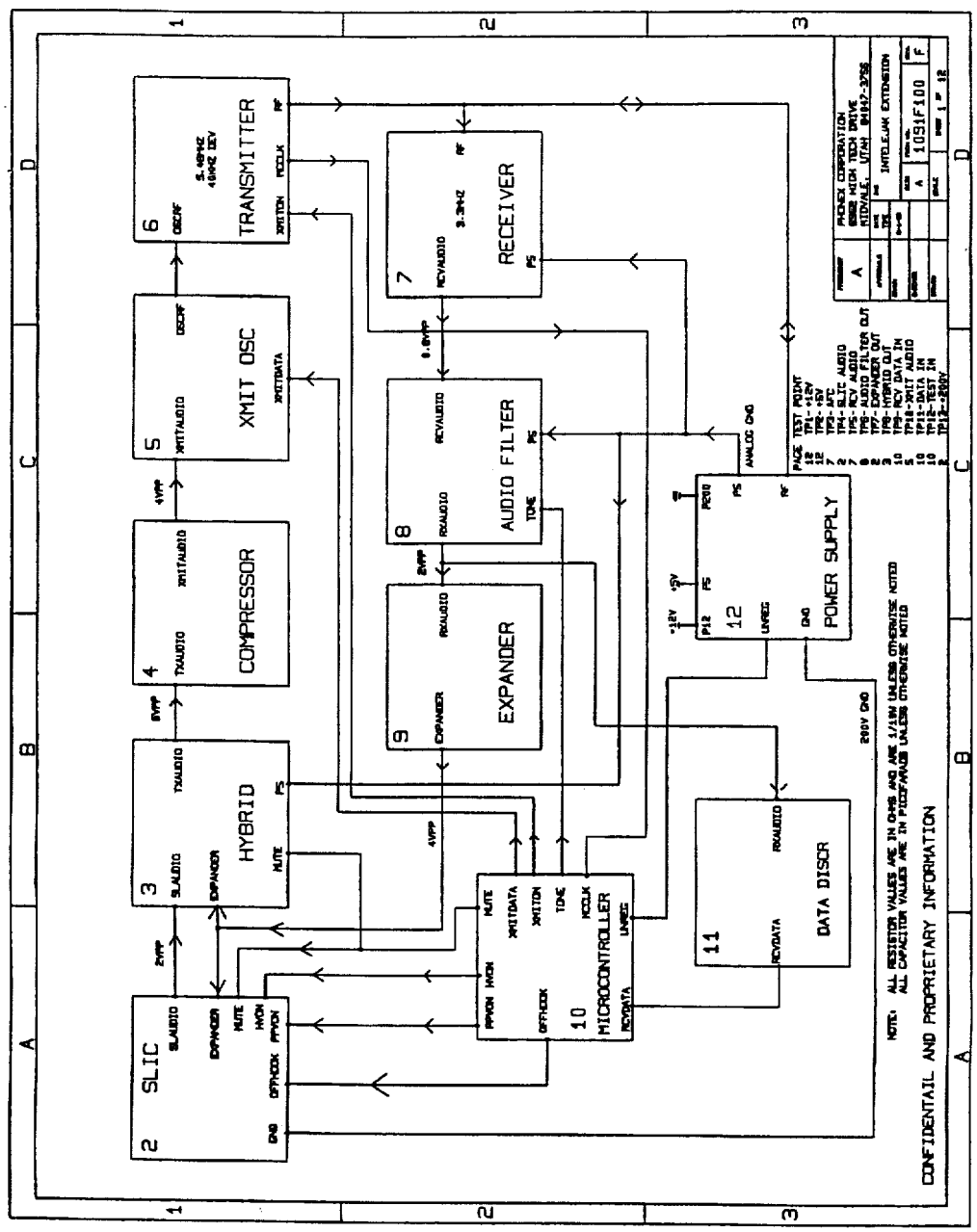

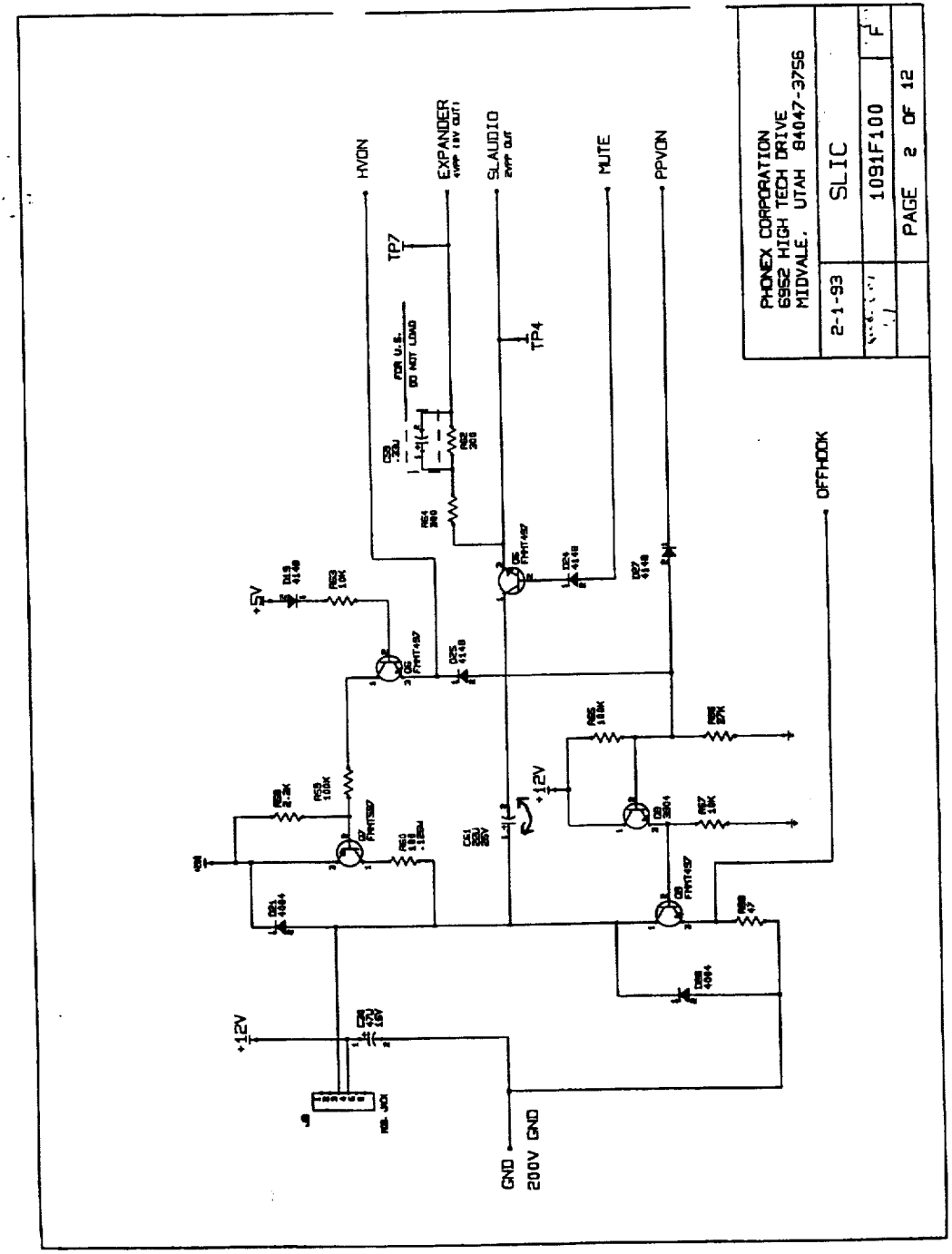

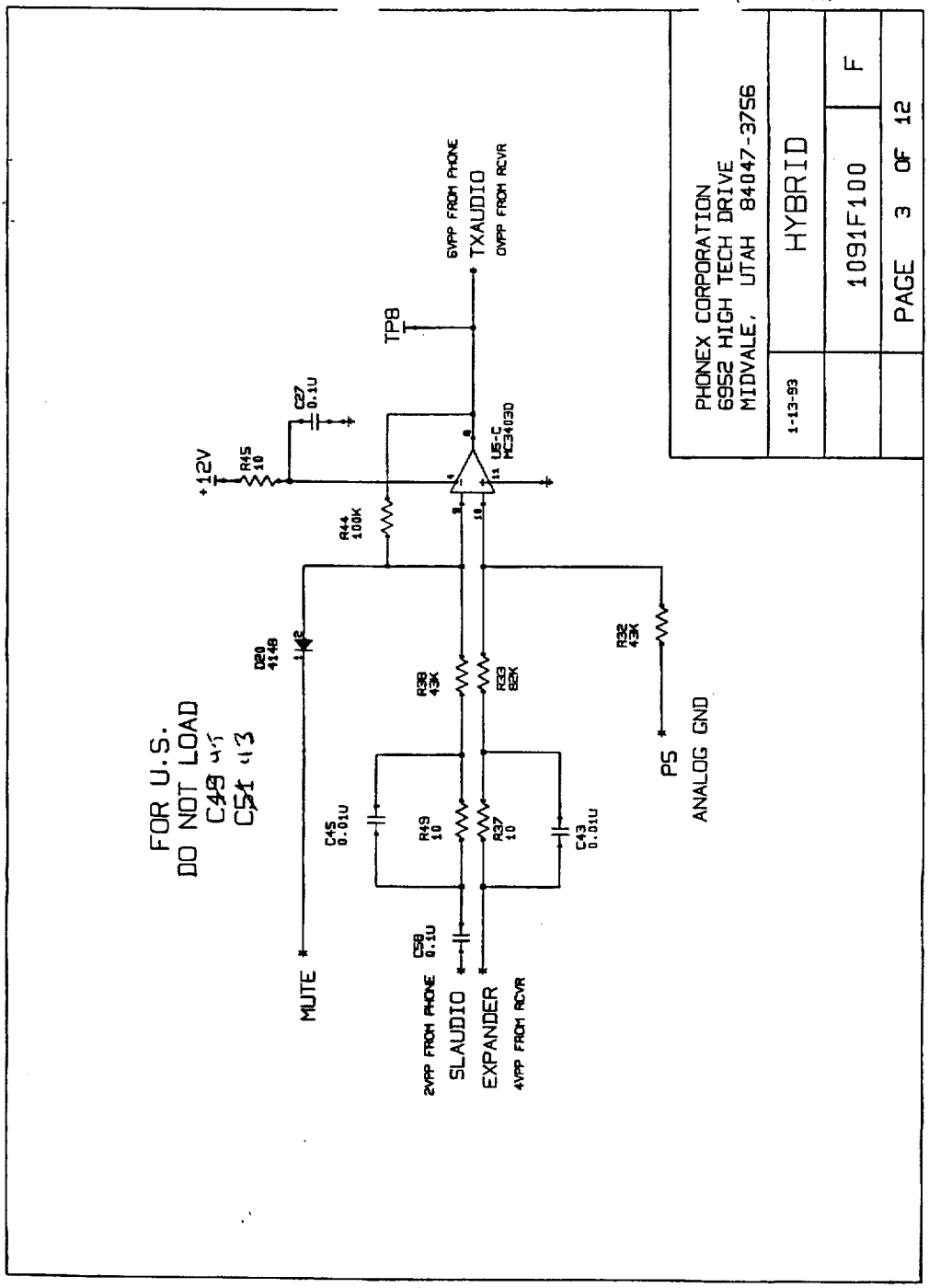

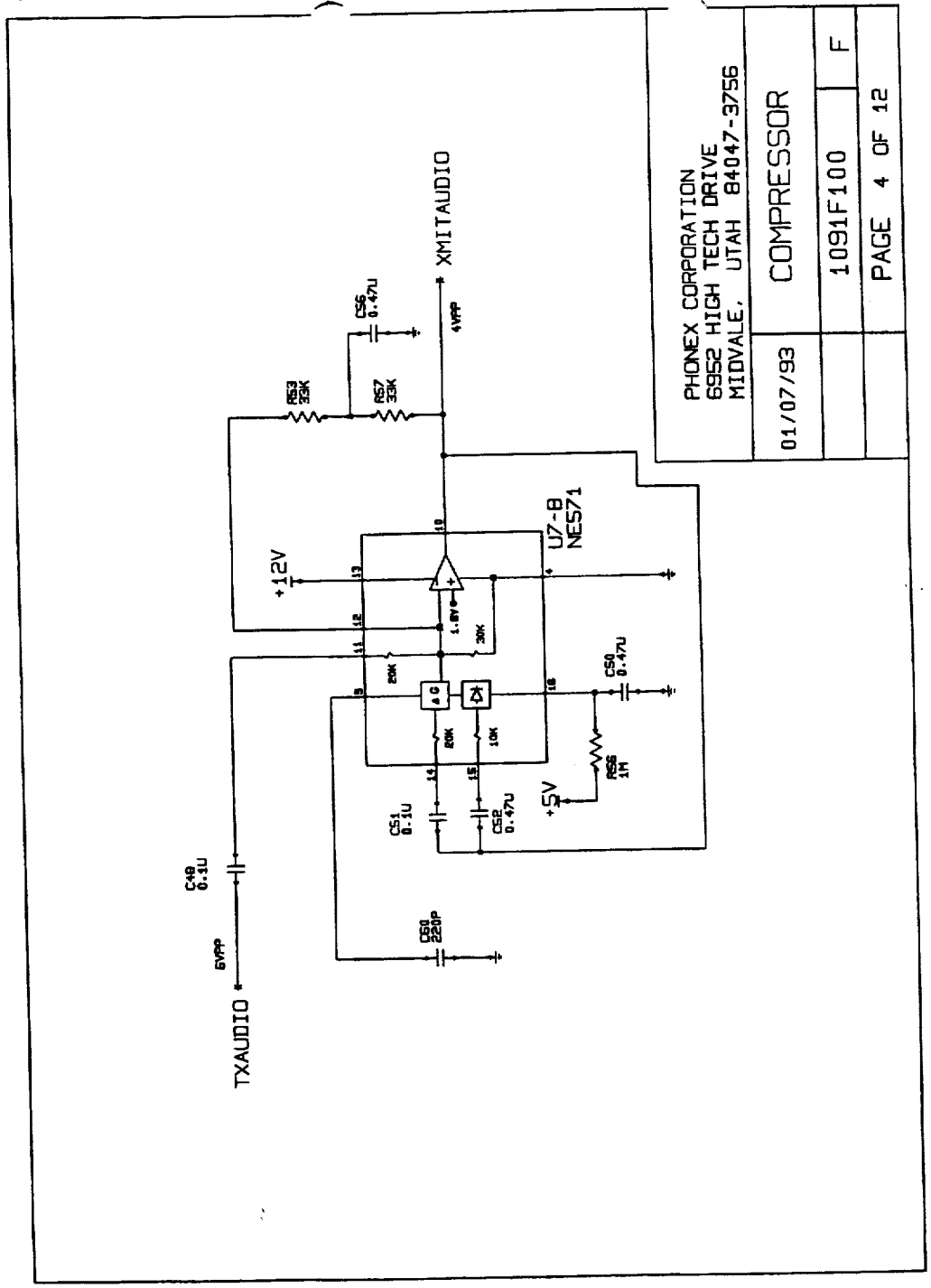

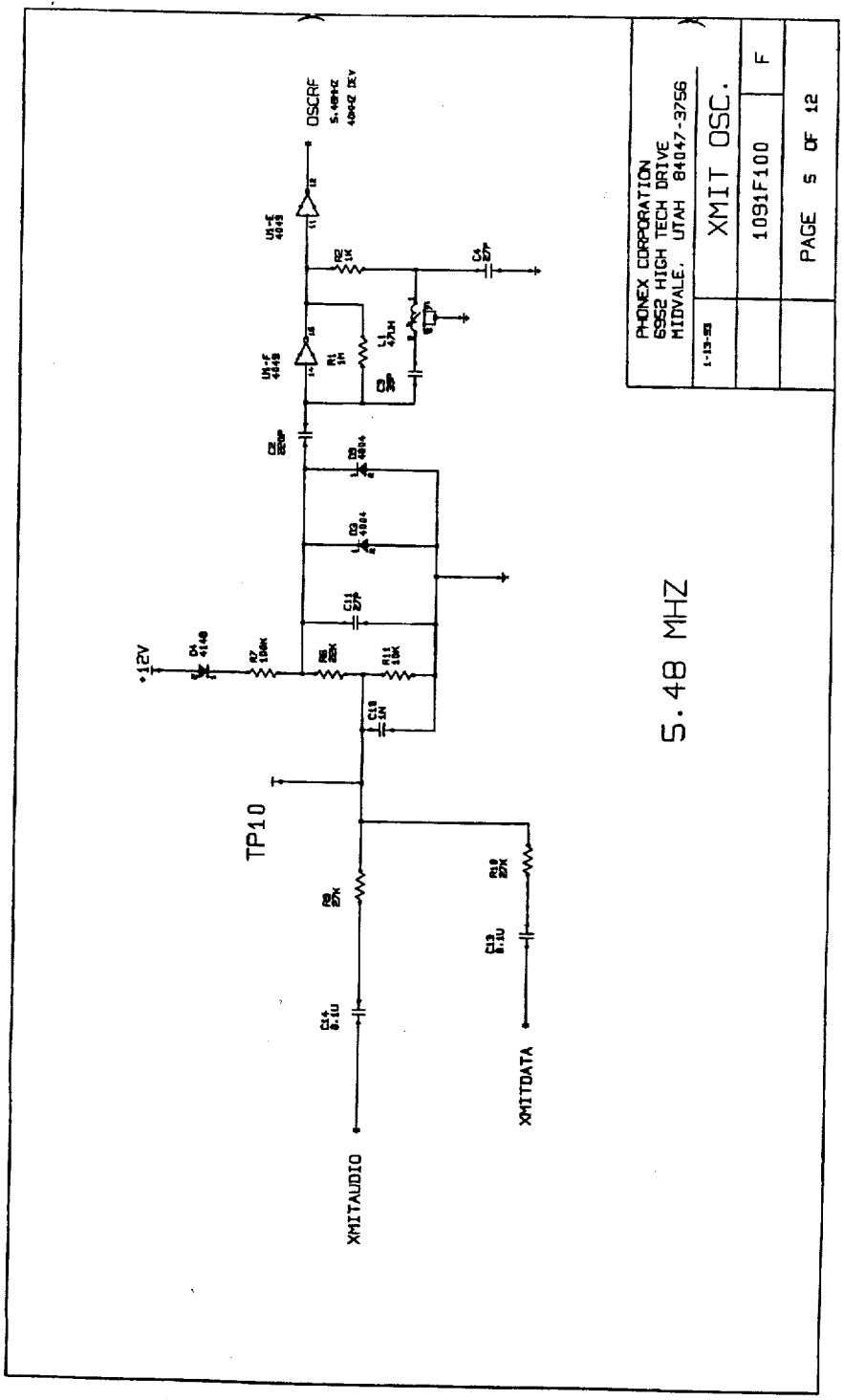

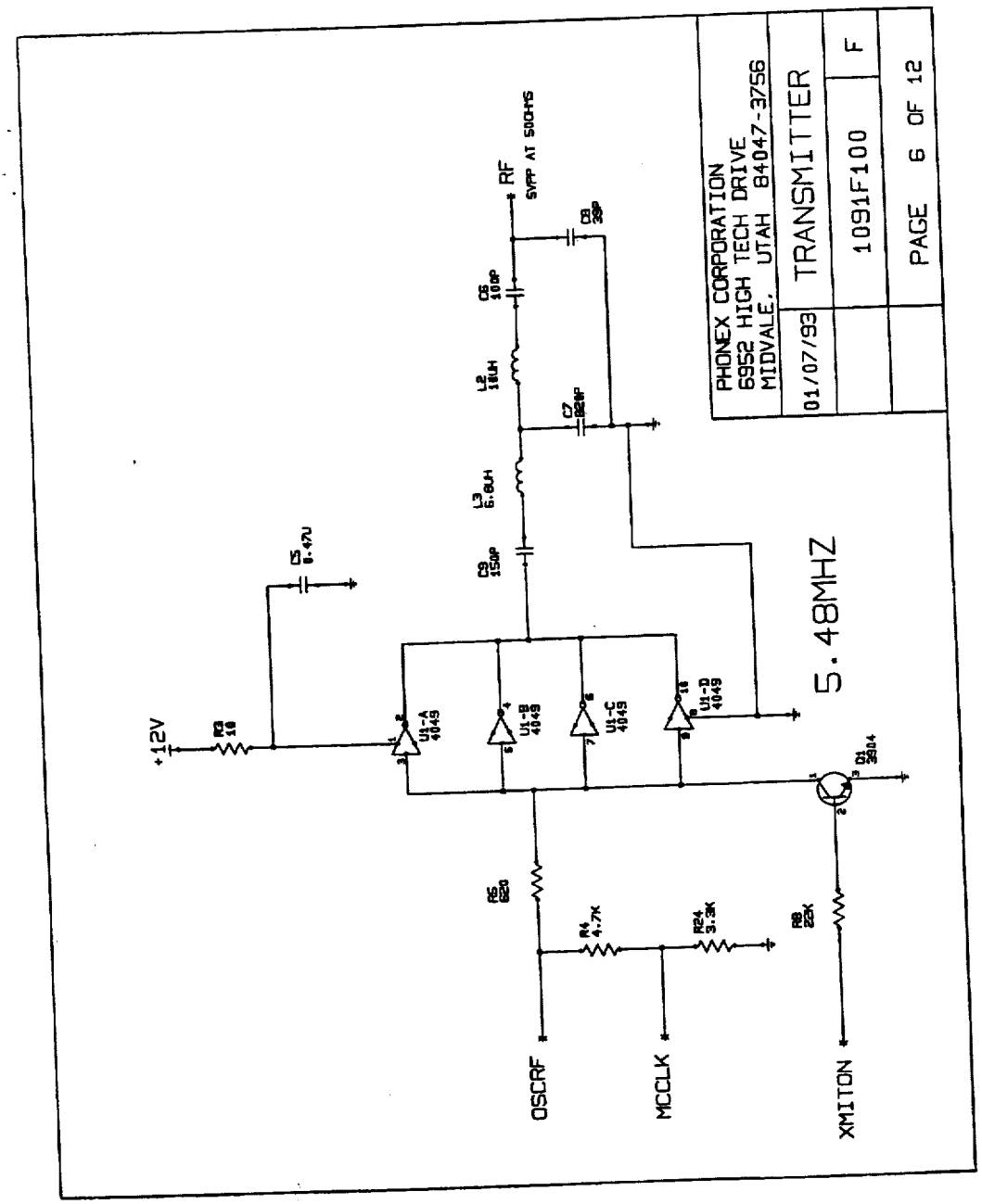

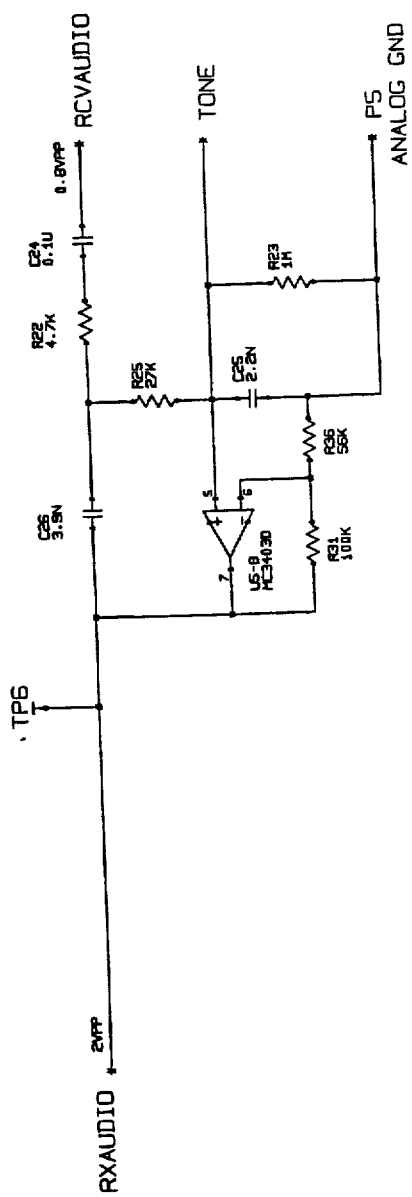

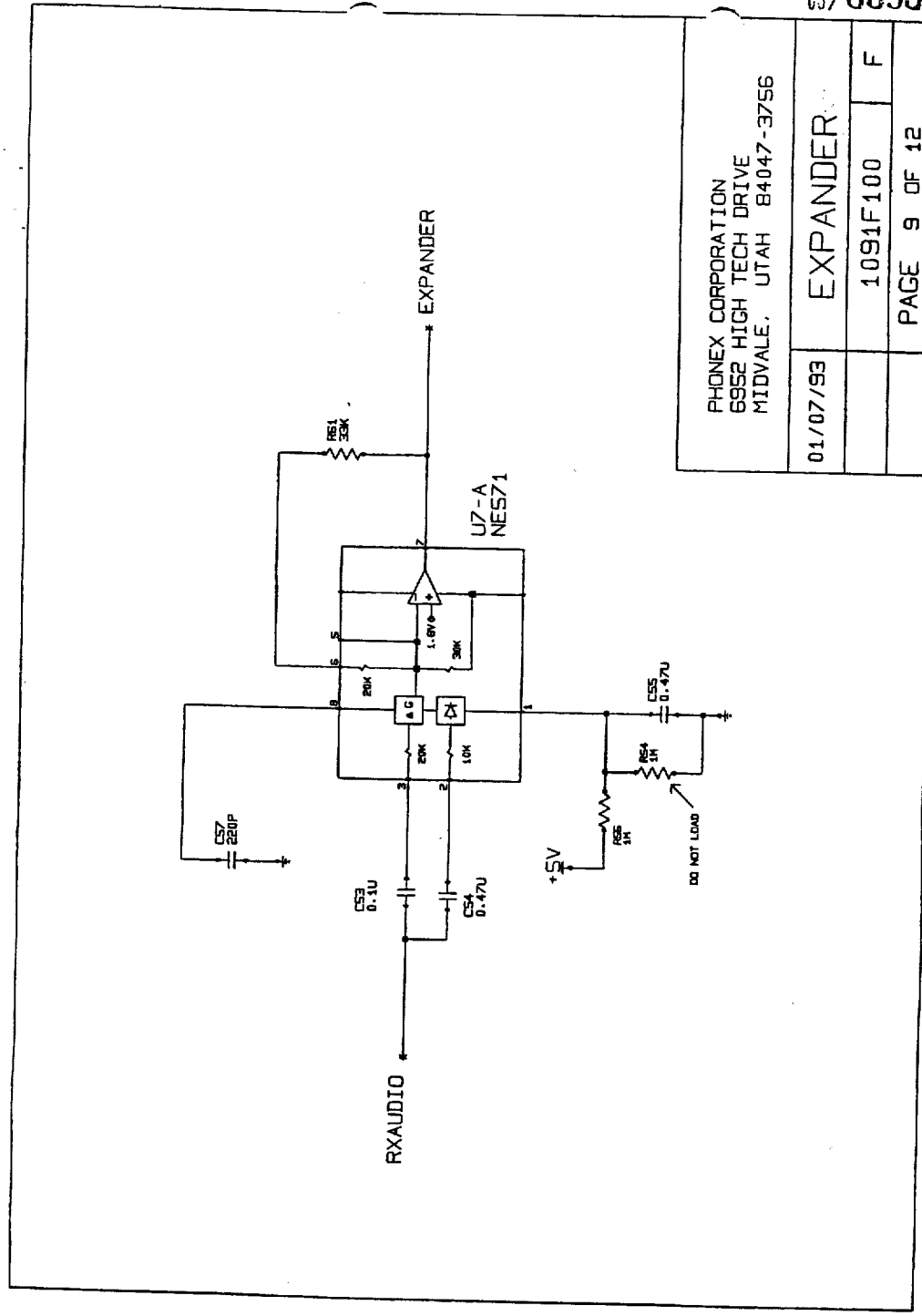

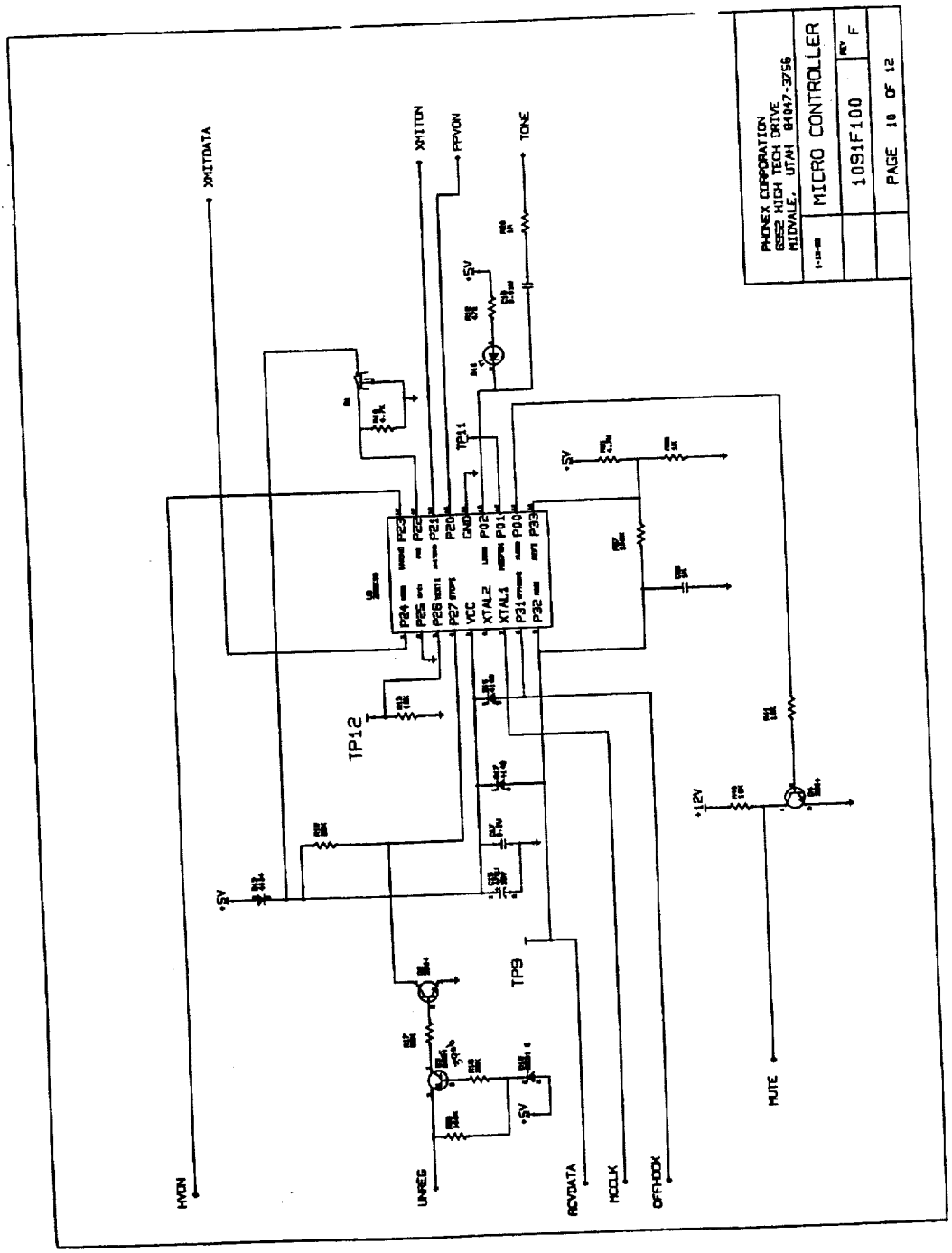

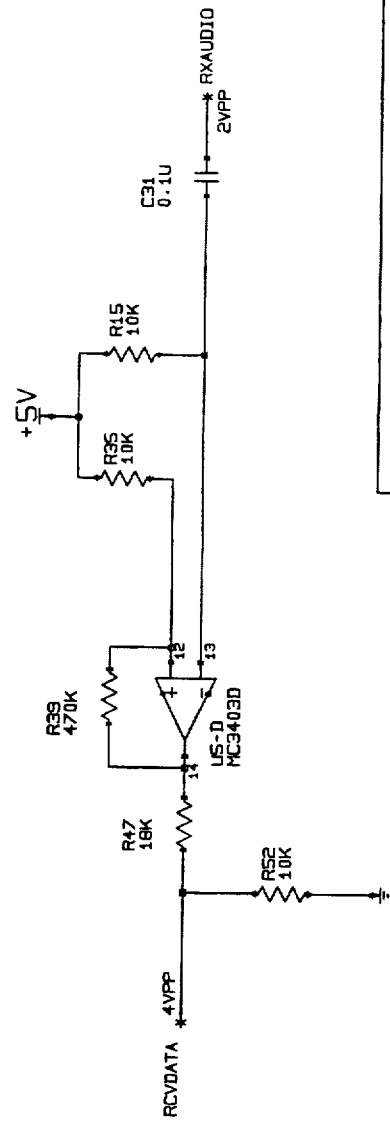

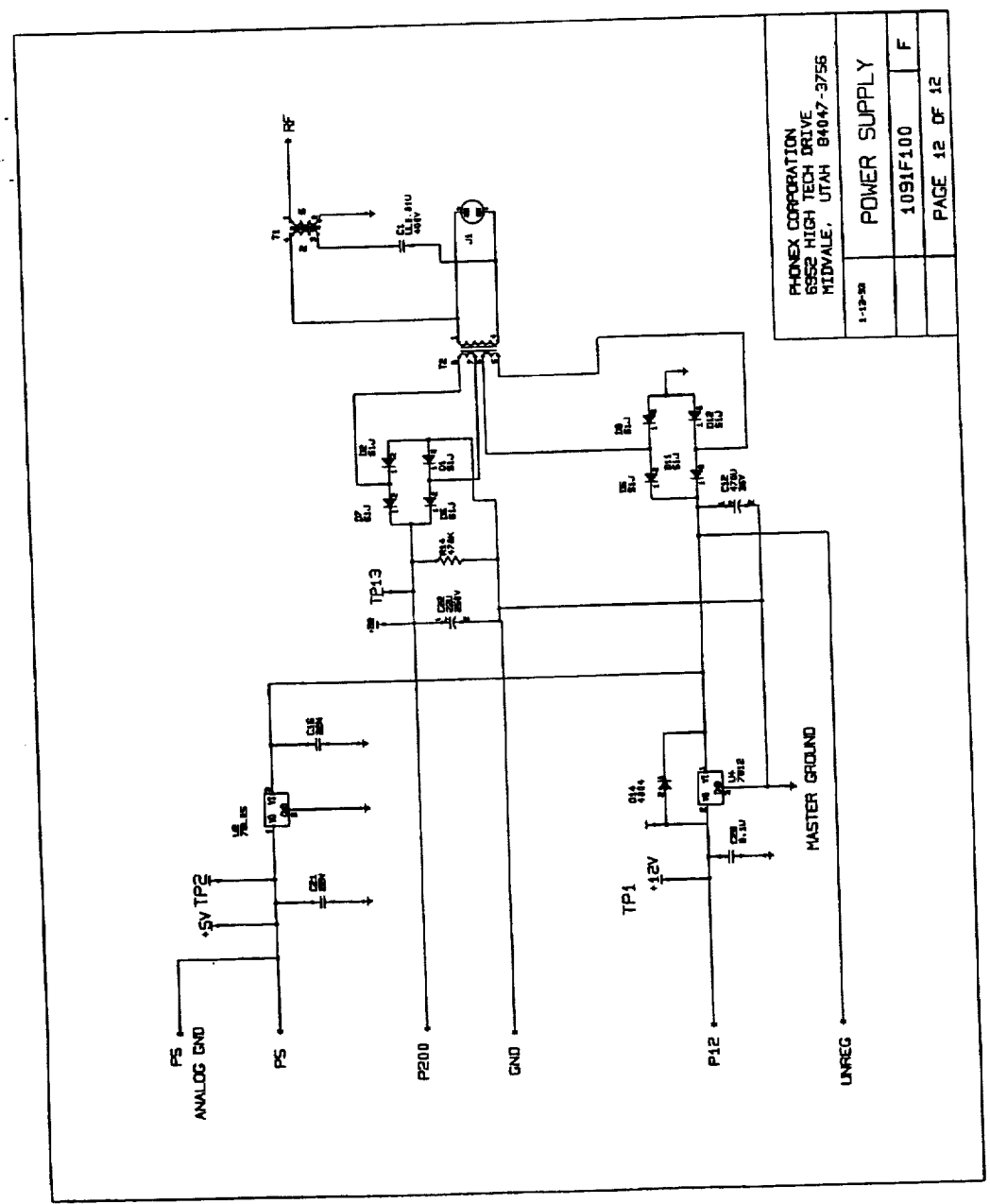

What is claimed and desired to be secured by United States Letters Patent is:

1. A secure access telephone communications system for transmitting and receiving telephone communications between a base unit and an extension unit, the system comprising:
   (a) a base unit and an extension unit, said base and extension unit each comprising:
      (i) means for sensing the operating status of said base and extension unit and its inputs from phone apparatus and lines;
      (ii) means for generating a transmission carrier;
      (iii) means for modulating said transmission carrier with audio and data signals;
      (iv) means for controlling the transmission of audio, digital, telephone and rf signals out of said base and extension unit between subsystems, between base and extension units, between central office subscriber line and base unit and between extension unit and phone set;
      (v) means for controlling said signals on the basis of data and other signals;
      (vi) means for coupling said transmission carrier to a communications medium;
   (b) means for coupling a subscriber telephone line to said base unit;
   (c) means for coupling a phone apparatus to said extension unit.

2. A secure access telephone communications system for transmitting and receiving telephone communications between a base unit and an extension unit, the system comprising:
   (a) a base unit and an extension unit, said base and extension unit each comprising:
      (i) means for sensing signals at the inputs of said base and extension unit and its inputs from phone apparatus and lines;
      (ii) means for generating a transmission carrier;
      (iii) means for modulating said transmission carrier with audio and data signals;
      (iv) means for controlling the transmission of audio, digital, telephone and rf signals within and out of said base and extension unit between subsystems, between base and extension units, between central office subscriber line and base unit and between extension unit and phone set;
      (v) system controller means operably connected to said input sensing and transmission controlling means for controlling said signals on the basis of data and other signals;
      (vi) means for coupling said transmission carrier to a communications medium;
   (b) means for coupling a subscriber telephone line to said base unit;
   (c) means for coupling accessory apparatus to said extension unit.

3. A secure access telephone communications system as recited in claim 1 wherein said system control means further comprises means for sending control messages wherein the control messages comprise a synchronous byte, security keys and system control keys.

4. A secure access telephone communications system as recited in claim 1 further comprising means for receiving and demodulating control messages.

5. A secure access telephone communications system as recited in claim 3 further comprising means for discriminating control messages from audio and noise signals.

6. A secure access telephone communications system as recited in claim 1 wherein said means for coupling accessory apparatus to said extension unit includes means for coupling a phone set to said extension unit.

7. A secure access telephone communications system for transmitting and receiving telephone communications between a base unit and an extension unit, the system comprising:
   (a) a base unit and an extension unit, said base and extension unit each comprising:
      (i) means for sensing the operating status of said base and extension unit and its inputs from phone apparatus and lines;
      (ii) means for generating a transmission carrier;
      (iii) means for modulating said transmission carrier with audio and data signals;
      (iv) means for controlling the transmission of audio, digital, telephone and rf signals out of said base and extension unit between subsystems, between base and extension units, between central office subscriber line and base unit and between extension unit and phone set;
      (v) means for controlling said signals on the basis of data and other signals;
      (vi) means for coupling said transmission carrier to a communications medium;
   (b) means for coupling a subscriber telephone line to said base unit;
   (c) means for coupling a phone apparatus to said extension unit.

* * * * *

UNITED STATES PATENT AND TRADEMARK OFFICE
CERTIFICATE OF CORRECTION

| | | |
|---|---|---|
| PATENT NO. | : 5,852,785 | Page 1 of 1 |
| APPLICATION NO. | : 08/639508 | |
| DATED | : December 22, 1998 | |
| INVENTOR(S) | : Bartholomew et al. | |

It is certified that error appears in the above-identified patent and that said Letters Patent is hereby corrected as shown below:

On the Title page, item (56), under "Foreign Patent Documents", Line 6, delete "2 094 958" and insert -- 2 094 598 --.

Page 2, item (56), under "U.S. Patent Documents", Line 53, delete "4,222,036" and insert -- 4,222,035 --.

Page 3, item (56), under "Other Publications", Line 2, delete "currnet" and insert -- current --.

Column 1, line 4, below Title insert -- CROSS-REFERENCE TO RELATED APPLICATION --.

Signed and Sealed this
Third Day of July, 2012

David J. Kappos
*Director of the United States Patent and Trademark Office*